US009169772B2

United States Patent
Han

(10) Patent No.: US 9,169,772 B2
(45) Date of Patent: Oct. 27, 2015

(54) ONE-STROKE INTERNAL COMBUSTION ENGINE

(71) Applicant: Kyung Soo Han, Timonium, MD (US)

(72) Inventor: Kyung Soo Han, Timonium, MD (US)

(73) Assignee: Differential Dynamics Corporation, Owings Mills, MD (US)

( * ) Notice: Subject to any disclaimer, the term of this patent is extended or adjusted under 35 U.S.C. 154(b) by 0 days.

(21) Appl. No.: 14/225,658

(22) Filed: Mar. 26, 2014

(65) Prior Publication Data

US 2014/0290616 A1     Oct. 2, 2014

Related U.S. Application Data

(60) Provisional application No. 61/805,584, filed on Mar. 27, 2013, provisional application No. 61/825,560, filed on May 21, 2013.

(51) Int. Cl.
*F02B 75/18*     (2006.01)
*F02B 53/04*     (2006.01)
(Continued)

(52) U.S. Cl.
CPC ................. *F02B 53/04* (2013.01); *F01C 1/063* (2013.01); *F01C 9/00* (2013.01); *F02B 75/265* (2013.01); *F02B 75/282* (2013.01); *F02B 75/32* (2013.01); *F02B 2075/023* (2013.01)

(58) Field of Classification Search
CPC .. F02B 2075/023; F02B 75/265; F02B 75/32; F02B 75/285; F02B 75/282; F02B 75/28; F02B 75/26; F02B 75/18; F02B 75/005; F02B 71/00
USPC .......... 123/200, 46 A, 46 E, 46 R, 52.1, 52.2, 123/53.1, 53.3, 53.5, 53.6, 18 A
See application file for complete search history.

(56) References Cited

U.S. PATENT DOCUMENTS 793,091 A * 6/1905 Perry ........................... 123/53.6
832,268 A * 10/1906 Morrow ....................... 123/53.6
(Continued)

FOREIGN PATENT DOCUMENTS

| GB | 514842 | 11/1939 | |
|---|---|---|---|
| JP | 59226231 A * | 12/1984 | .............. H01M 6/08 |
| WO | WO 03052248 A1 * | 6/2003 | .............. F02B 75/28 |

OTHER PUBLICATIONS

PCT/US2014/034859, International Search Report and Written Opinion, Oct. 27, 2014, 10 pages.

*Primary Examiner* — Kenneth Bomberg
*Assistant Examiner* — Jason T Newton
(74) *Attorney, Agent, or Firm* — Cameron LLP

(57) ABSTRACT

One-stroke internal combustion engines may comprise reciprocating pistons which are either straight or rotary. Three principles are required to make one-stroke engines work: create four dedicated chambers, assign the chambers with coordinated functions, and make pistons move in unison. The functions will be assigned only to a single stroke but an Otto cycle produces a repeating four stroke cycle. Since four functions are performed simultaneously during one stroke, every stroke becomes a power stroke. In reality, 1-stroke engines are physically rearranged 4-stroke engines. Both straight and rotary 1-stroke engines can be modified to comprise opposed piston opposed cylinder (OPOC) engines. The reciprocating piston output of 1-stroke pistons may be converted to continuously rotating output by using crankshafts with split bushings or newly developed Crankgears with conventional bearings. A 1-stroke engine may require only one crankshaft and thus may reduce the number of parts and increase the specific power ratio.

4 Claims, 30 Drawing Sheets

(51) Int. Cl.
*F01C 9/00* (2006.01)
*F02B 75/26* (2006.01)
*F02B 75/28* (2006.01)
*F02B 75/32* (2006.01)
*F01C 1/063* (2006.01)
*F02B 75/02* (2006.01)

(56) References Cited

U.S. PATENT DOCUMENTS

| | | | | |
|---|---|---|---|---|
| 1,741,731 | A * | 12/1929 | Nordensson | 417/364 |
| 1,785,643 | A | 12/1930 | Noack et al. | |
| 2,002,957 | A * | 5/1935 | Longobardi | 123/51 R |
| 2,814,551 | A * | 11/1957 | Broeze et al. | 60/525 |
| 2,963,008 | A | 12/1960 | Waldrop | |
| 3,283,752 | A * | 11/1966 | Stelzer | 123/46 R |
| 3,702,746 | A * | 11/1972 | Parmerlee | 417/481 |
| 3,835,824 | A * | 9/1974 | MacDonald | 123/46 R |
| 3,853,100 | A * | 12/1974 | Braun | 123/46 R |
| 4,205,528 | A | 6/1980 | Grow | |
| 4,414,927 | A * | 11/1983 | Simon | 123/62 |
| 4,599,976 | A * | 7/1986 | Meuret | 123/18 R |
| 4,819,594 | A | 4/1989 | Tsakiroglou | |
| 5,086,732 | A * | 2/1992 | Seno | 123/18 R |
| 5,289,802 | A * | 3/1994 | Paquette et al. | 123/18 A |
| 5,794,574 | A | 8/1998 | Bostelmann et al. | |
| 5,813,371 | A * | 9/1998 | Peel | 123/46 R |
| 6,036,461 | A * | 3/2000 | Bahniuk | 418/35 |
| 6,135,069 | A * | 10/2000 | Fenelon et al. | 123/46 R |
| 6,170,443 | B1 | 1/2001 | Hofbauer | |
| 6,199,519 | B1 | 3/2001 | Van Blarigan | |
| 6,700,229 | B2 | 3/2004 | Sadarangani et al. | |
| 7,077,080 | B2 * | 7/2006 | Schmuecker et al. | 123/46 R |
| 7,258,086 | B2 | 8/2007 | Fitzgerald | |
| 7,849,822 | B2 * | 12/2010 | Yim | 123/18 R |
| 7,931,006 | B1 * | 4/2011 | Kamenov | 123/245 |
| 8,127,544 | B2 | 3/2012 | Schwiesow et al. | |
| 8,490,380 | B2 | 7/2013 | Hofbauer | |
| 2002/0139323 | A1 * | 10/2002 | Kerrebrock | 123/46 E |
| 2003/0121482 | A1 * | 7/2003 | Macey | 123/18 R |
| 2003/0192503 | A1 | 10/2003 | James | |
| 2005/0257759 | A1 * | 11/2005 | Pischinger et al. | 123/46 R |
| 2005/0284427 | A1 * | 12/2005 | Barth | 123/46 R |
| 2007/0125320 | A1 * | 6/2007 | Smith et al. | 123/18 R |
| 2009/0007861 | A1 * | 1/2009 | Major | 123/63 |
| 2010/0217499 | A1 * | 8/2010 | Gracia Lopez | 701/102 |
| 2011/0162599 | A1 | 7/2011 | Wolverton et al. | |
| 2012/0024264 | A1 * | 2/2012 | Mikalsen et al. | 123/46 R |

\* cited by examiner

| Design | Inventor | Description | Pros & Cons |
|---|---|---|---|
|  | Russell Bourke | 2-Stroke Pistons Two Pistons Straight | Few parts Low efficiency High s-power ratio |
| 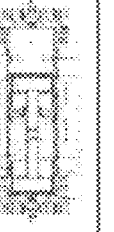 | Paul Schwiesow | 2-Stroke Pistons A Double-headed Straight | Few parts Low efficiency High s-power ratio |
|  | Stuart Macey | 2-Stroke Pistons Rotary Piston | Few parts Low efficiency High s-power ratio |
|  | Peter Hofbauer | 2-Stroke Pistons OPOC Engine Straight | More Parts (?) Low efficiency High s-power ratio |

Engines in Development

FIG. 11
PRIOR ART

ENGINE APPLICATIONS

| Engines | Currently used | | DDMotion |
|---|---|---|---|
| Type of Piston Assemblies | 4-Stroke | 2-Stroke | 1-Stroke |
| Output Shaft to be Rotated | 720° | 360° | 180° |
| Power Stroke per Piston | 180° | 180° | 180° |
| No. of Piston Assemblies | 4 | 2 | 1 |
| No. of Crankshafts | 4 | 2 | 1 |
| Number of Parts | ~500 Parts | ~250 Parts | ~200 Parts |
| Dedicated Chambers | 4 | 1 | 4 |
| Shared Chambers | None | 1 | None |
| Fuel Efficiency | High | Low | High |
| Emissions | Low | High | Low |
| Specific Power Ratio | 1.0 (REF) | 1.5 | >1.5 |
| Applications | Cars<br>--<br>-- | --<br>Small Engines<br>Power Vehicles | Cars<br>Small Engines<br>Power Vehicles |

FIG. 12

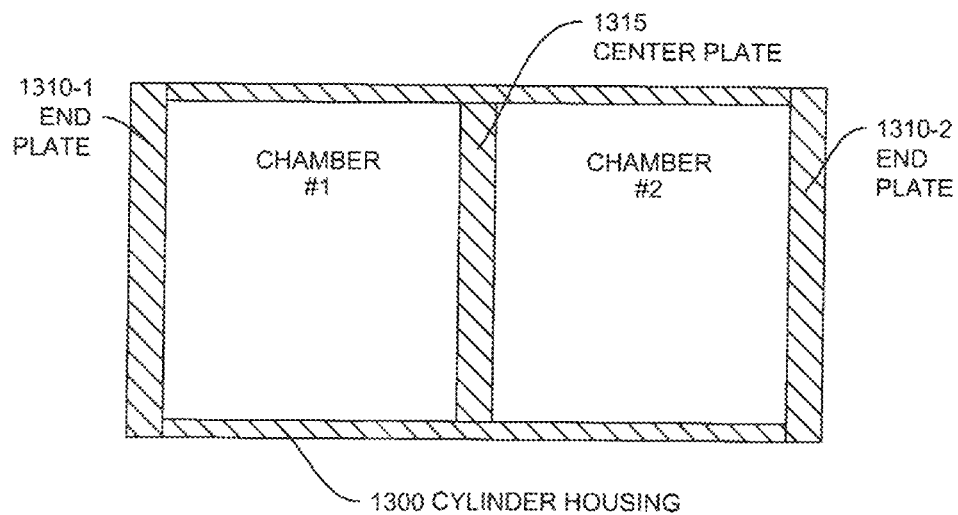
(A)
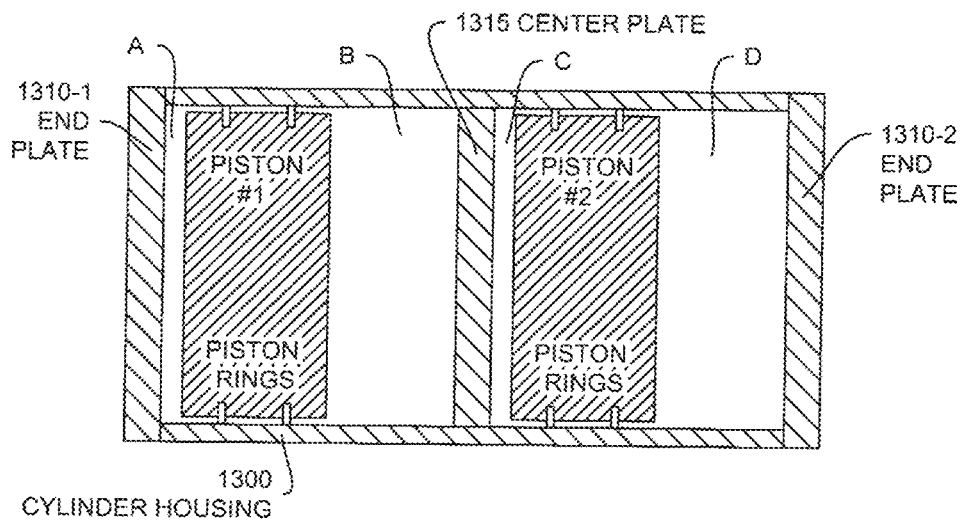
(B)
Fig. 13

| Piston Assembly (Multiple of piston assemblies will be used to make an engine) | | 4-Stroke | 2-Stroke | 1-Stroke |
|---|---|---|---|---|
| | Piston | 1 Single Headed | 1 Double Headed | 2 Double Headed |
| 2 | # of Pistons | 1 Single Headed | 1 Double Headed | 2 Double Headed |
| 3 | # of Crankshafts | 1 | 1 | None |
| 4 | # of Crankcases | None | 1 | None |
| 5 | # of Dedicated Chambers | 1 Dedicated | 1 Dedicated | 4 Dedicated |
| 6 | # of Shared Chambers | None | 1 Shared | None |
| Engine | | | | |
| 7 | # of Piston Assemblies | 4 Assemblies | 2 Assemblies | 1 Assembly |

FIG. 18

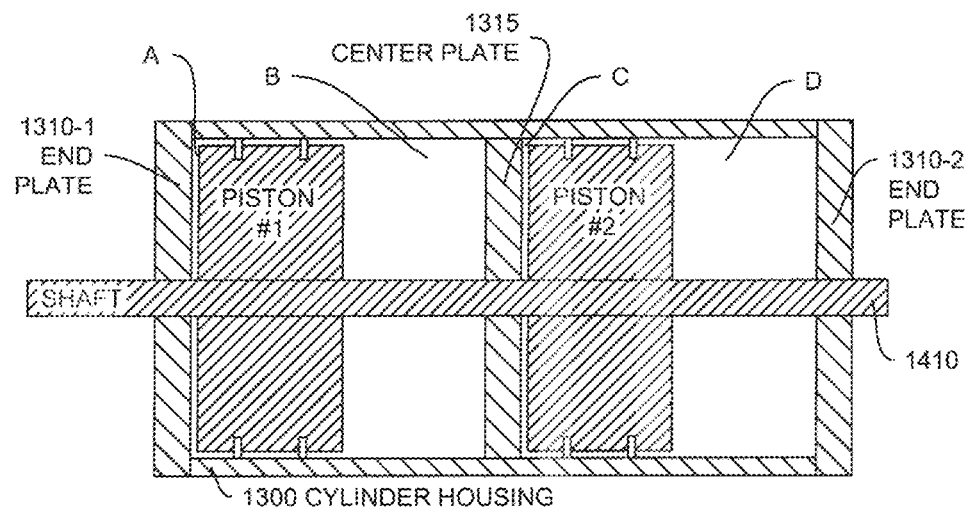
(A)
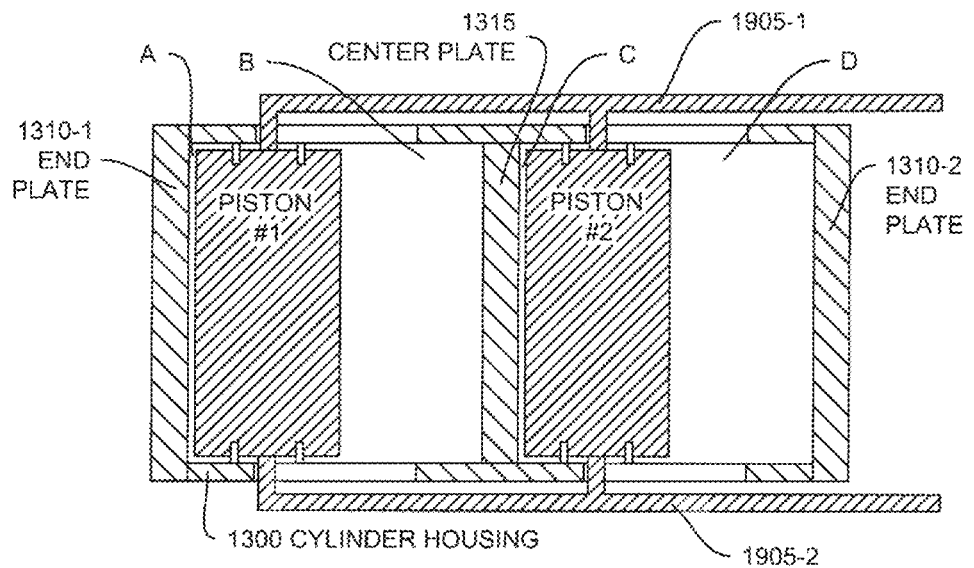
(B)
FIG. 19

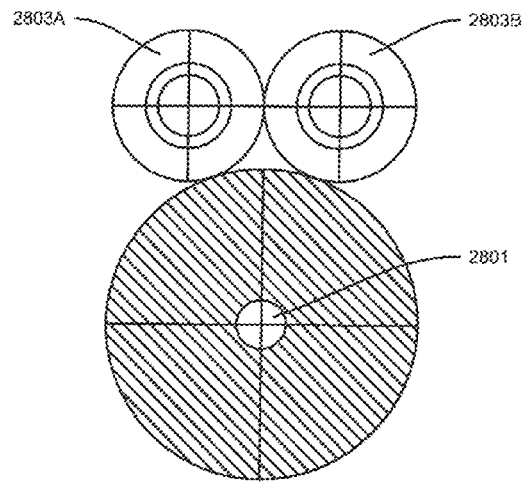
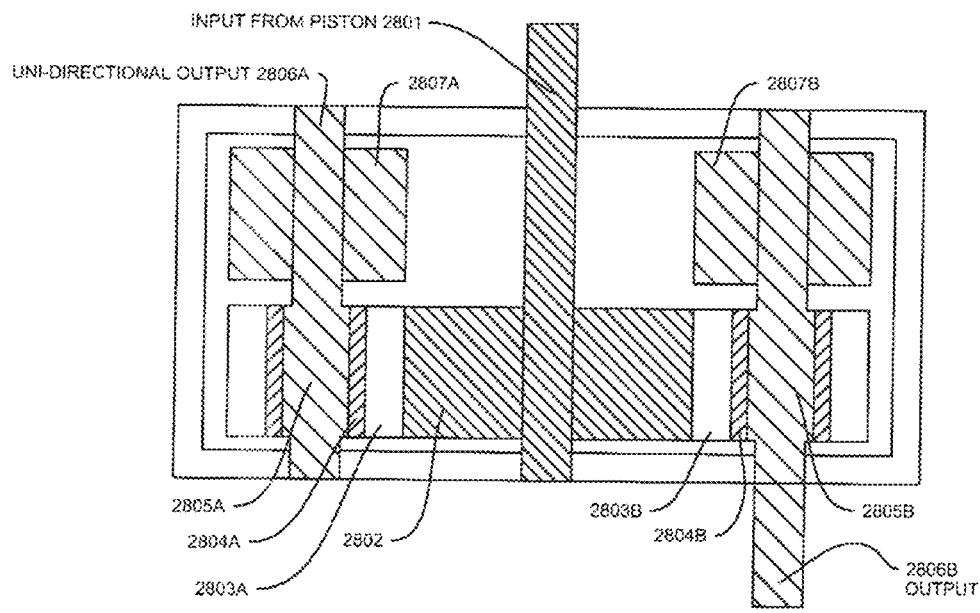
FIG. 28

ONE-STROKE INTERNAL COMBUSTION ENGINE

This application claims the benefit of priority to U.S. Provisional Patent Application Ser. Nos. 61/805,584 filed Mar. 27, 2013 entitled "Reciprocating Rotary or Linear Engines with Dedicated Chambers for Intake and Exhaust" and 61/825,560 entitled "Reciprocating Rotary or Straight/Linear Engines with Dedicated Chambers for Intake, Compression, Ignition/Combustion, and Exhaust" by Kyung Soo Han, the contents of each of which are incorporated by reference as to their entire contents.

TECHNICAL FIELD

The technical field of the invention relates to providing an efficient internal combustion engine being a one-stroke internal combustion engine having a coordinated cycle making every stroke a power stroke and, more particularly, to an efficient engine having a reciprocating piston stroke, dedicated intake, compression, ignite/combustion and exhaust chambers which share the coordinated one-stroke engine cycle, improved scavenging, simple sequential cycling and comprising either a straight/linear, rotary or opposed piston configuration, straight/linear or rotary.

BACKGROUND

A reciprocating four-stroke straight piston is well-known in the engine arts. Referring to PRIOR ART FIG. 1, there is shown a conventional spark plug 1 that is ignited during an ignition stroke. Valve 2 is an intake valve for allowing fuel into chamber 9. Valve 3 is an exhaust valve for allowing exhaust which typically comprises some unburned fuel, carbon monoxide or other elements demonstrating some inefficiency in combustion to exit chamber 9. This inefficiency is even more pronounced in two-stroke piston engines without dedicated chambers (known two-stroke engines discussed in greater detail below). A rocker arm 4 is pivoted and valve lifter 6 raises pushrod 5 to lever rocker arm 4 to raise intake valve 2. There is typically a camshaft 7, timing belt 8 and the timing belt 8 controls the intake valve 2 lifting with the crankshaft 14 turning. A cylinder 10 is provided along with ring 11, piston 12 and connecting rod 13 to crankshaft 14 which rotates an output shaft in response to four strokes: intake, compression, ignition/combustion and exhaust, more fully shown in PRIOR ART FIG. 2.

Referring now to PRIOR ART FIG. 2, there is shown an animation sequence for a four-stroke piston of FIG. 1 having dedicated chambers 9 for each of four stokes. Beginning with Intake stroke 1, intake valve 2 is shown open in Intake stroke 1 (left) while chamber 9 is expanding to allow fuel/air to enter chamber 9. Exhaust valve 3 is closed. In Compression stroke 2 (left center), both valves 2 and 3 are closed, the chamber 9 is expanded but is beginning compression of the fuel in chamber 9 as the crankshaft 14 turns counterclockwise (arrows) prior to Ignition. In Ignition stroke 3 (right center), the spark plug 1 is ignited when the fuel/air mixture is compressed so as to cause the piston 12 to move downward from the internal combustion of the ignited mixture. The crankshaft 14 is thus forced to turn from the internal combustion. In Exhaust stroke 4, exhaust valve 3 is opened to allow the combustion results to exit as shown by the arrow above the exhaust valve 3. Chamber 9 is alternatively compressed and expanded with each of the four strokes 1, 2, 3 and 4. There thus are seen dedicated chambers 9 for each stroke of an engine cycle. When there are four "four-stroke" pistons as shown in PRIOR ART FIG. 3, there is provided a coordinated movement of crankshaft 14 as each piston is performing a different stroke of an engine cycle: from left to right, compression ready for ignition, ignition ready for exhaust, intake complete ready for compression and exhaust ready for intake.

A conventional two-stroke piston is shown in PRIOR ART FIG. 4. The upstroke is shown on the left and the downstroke is shown on the right. During upstroke (left), there is fuel compression, ignition, the transfer port is covered, the connecting rod has pushed up on the piston and the valve is open allowing fuel mixture to be drawn into the crankcase. During downstroke (right), the transfer port is uncovered and fuel mixture is forced into the chamber and burned fuel is pushed out by the compressed fuel mixture, the burned fuel shown as black dots. The piston is completely lowered and the connecting rod shows the crankshaft/connecting rod, in a down position. The output shaft is shown rotating counterclockwise.

PRIOR ART FIG. 5 shows a conventional two-stroke engine with a turbocharger having one dedicated chamber. Air enters from the left; fuel is injected by a fuel injector. A fuel and air mixture is formed in the crankcase, fills the chamber, is compressed and then is ignited by the SPARK and BURNT FUEL is exhausted toward the TURBOCHARGER where it is salvaged to provide further engine power.

The well-known Wankel rotary engine (with Otto cycle) attributed to Felix Wankel is shown in PRIOR ART FIG. 6. A shaft B is at the middle of an oblong chamber having INTAKE and EXHAUST ports. The triangular rotary piston is shown as piston A and is caused, via gearing shown, to rotate the shaft B through INTAKE, COMPRESSION, IGNITION and EXHAUST. Two spark plugs are shown at the right of the oblong chamber. It may be seen that when the piston A is causing contents of a chamber formed proximate the spark plugs to be compressed, ignition will cause combustion and the rotary piston A will rotate the shaft B.

It is generally known in the art to provide two-stroke engines as described above. A two-stroke engine may be defined as an engine having a power stroke per a revolution of an associated crankshaft of 360° and with two strokes, or, for example, upward or downward movements (upstroke/downstroke). U.S. Pat. No. 8,127,544 issued Mar. 6, 2012 to Schwiesow et al. (Schwiesow) describes the history of so-called "double acting" two-stroke engines from U.S. Pat. No. 1,785,643 to W. G. Noack et al. issued Dec. 16, 1930, to U.S. Pat. No. 7,258,086 to Fitzgerald issued Aug. 21, 2007. In Schwiesow, the following so-called "double-acting" systems are described: those of U.S. Pat. No. 2,963,008 to Waldrop, U.S. Pat. No. 4,205,528 of Grow, U.S. Pat. No. 6,199,519 to Van Blarigan, U.S. Pat. No. 6,700,229 to Sadarangani et al. and U.S. Pat. No. 7,258,086 to Fitzgerald. As early as Noack el al. '643, circa 1930, FIG. 1 shows pistons 6 and 7, and FIG. 2, shows additional compressor pistons 11 and 12 having a back and forth movement within "free piston engine" 1. Waldrop '008 shows an improvement to a free piston engine including a fuel injection system. Grow '528 adds scavenging via a "fan scavenged two-stroke cycle."

An alleged improvement introduced by Schwiesow to these earlier "double-acting" two-stroke systems is a homogenous charge compression ignition (HCCI) for "essentially constant volume combustion." Schwiesow, represented by Prior Art FIG. 7, depicts an embodiment in each of the '544 patent's FIGS. 8-10 wherein first and second pistons are fixedly attached to each other via a rigid connecting rod so as to oscillate in a cylindrical case from one end to the other of the cylindrical case when cycled sparked ignition of each fuel/air chamber at each end of the cylindrical case occurs.

U.S. Pat. No. 6,170,443 to Hofbauer describes a supercharged opposed piston, opposed cylinder (OPOC) internal combustion engine which may be seen in PRIOR ART FIG. 10. A crankshaft rotational axis is shown driven by pushrods and pullrods connected to eccentrics. These comprise many driving arms which make the internal operation appear similar to that of a train locomotive. The OPOC engine of the '443 patent employs a conventional exhaust system. However, U.S. Pat. No. 8,490,380, issued Jul. 23, 2013, also to Hofbauer, describes an improved OPOC system having an incoming air chamber and an exhaust chamber in communication with a combustion chamber with improved scavenging.

Also known is the so-called Bourke internal combustion engine named for its inventor, Russell Bourke (FIG. 8). The Bourke engine is described in GB514842, accepted Nov. 20, 1939. Bourke shows in his GB '842 patent, FIGS. 1-4, oppositely disposed cylinders 20 with pistons therein driving connecting rods 19 and a rotatably mounted crank shaft. "The invention consists in driving gear for internal combustion engines having opposed cylinders, pistons and piston rods, a crank shaft and transmission means for converting the reciprocating rods of the pistons into rotary motion of the crank shaft which transmission means comprises a bearing member encircling the crank pin and means connected to the pistons and engaging against opposite sides of said bearing member characterized in that said means engaging against the bearing member are formed as a pair of separate bearing blocks rigidly mounted on plate like means acting to connect said blocks together." Bourke suggests that "each of the bearings 3, 6, 10 and 15 are preferably made up of inner and outer circular spaced races between which are a number of steel balls."

Referring to PRIOR ART FIG. 7, the Schwiesow engine is shown in some detail. The Schwiesow engine has double-acting "Two-stroke" pistons that move from one side to the other when alternating ignition occurs.

Referring to PRIOR ART FIG. 8, the Bourke engine is shown in some detail having four "Two-stroke" pistons and may be compared to the other depicted PRIOR ART engines.

Referring to PRIOR ART FIG. 9, a pioneer so-called "one stroke" Massey-Harris gasoline engine is shown but is better described as having a rotary two stroke piston. The Massey-Harris engine is attributed to Stuart Macey and is a reciprocating rotary two-stroke piston engine (while the Shwiesow piston reciprocates back and forth from its alternating ignition at each end). A one-stroke piston may be generally defined herein as a piston having a power stroke of 180°, but we consider the Macey engine as having a rotary two-stroke piston. Consequently, the one-stroke piston, for example, may move from a top dead center to the left and stop and then to the right and stop (completing one stroke) and/or back or forward to comprise a 180° power stroke in each of the backwards or forwards direction. An example of the one-stroke internal combustion engine is Macey, U.S. Published Patent Application No. 2003/0121482, abandoned. A piston block 20 defines a combustion cavity and a compression cavity. A "working assembly 40" is rotatably disposed in the block 20 including a cylindrical portion 46, a compression paddle 50 and a piston 48. There further is depicted an arcuate combustion cavity 28 and an arcuate compression cavity 30. A drive rod 90 operably interconnects the first and second piston blocks 20 for common driving of the components of the drive block 22.

A Table is provided in PRIOR ART FIG. 11, that provides a comparison of pro's and con's of four Engines in Development. The Bourke engine has two "Two Straight Pistons" in line that reciprocate back and forth. An advantage is a low part count and a high specific power ratio. The Bourke engine has one dedicated chamber as it reciprocates through its cycles. The Schwiesow engine may be described as a double-headed piston in line and reciprocates back and forth. Schwiesow is similar in advantages to Bourke in having fewer parts and a high ratio. Schwiesow has one dedicated chamber. The Macey reciprocating rotary piston engine has similar advantages and disadvantages to the Bourke and Schwiesow engines. The recent Hofbauer engine has two opposed pistons in line. It has many parts, started with the German company Volkswagen and is well-funded. It has one dedicated chamber.

All of the above-identified patents and published applications including the Bourke patent are incorporated by reference herein as to their entire contents.

Even with the above-described improvements to two-stroke internal combustion engines and other conventional engines, there still remains a need in the art to provide further enhancements and improvements to, for example, fuel efficiency and increased power at the improved fuel efficiency and further improved scavenging by means of further embodiments of rotary and straight-line reciprocating internal combustion engines having a coordinated cycle and one-stroke, for example, a 180° power stroke.

SUMMARY OF THE SEVERAL EMBODIMENTS

This summary is provided to introduce a selection of concepts. These concepts are further described below in the Detailed Description. This summary is not intended to identify key features or essential features of the claimed subject matter, nor is this summary intended as an aid in determining the scope of the claimed subject matter. These concepts relate to a coordinated one-stroke internal combustion engine with a reciprocating piston as will be further described herein and also may be referred to as a 1-Stroke™ engine. By one-stroke (or 1-stroke) is meant herein the movement caused by ignition of a spark plug associated with a piston causing the piston to move from zero speed, start, to move up to maximum speed and then, down to zero speed or stop, for example, in one direction. In a one-stroke piston engine, straight or rotary embodiment, as will be explained herein, every stroke is a power stroke.

Referring briefly to FIG. 12 showing a table entitled ENGINE APPLICATIONS of internal combustion engines, there are shown on the left, conventional or currently used internal combustion engines that are in production and are discussed above including, a conventional or currently used 4-stroke piston engine and a conventional 2-stroke piston engine. The table is intended to provide the reader with some insight into differences between conventional engines and an embodiment of a 1-stroke engine of the present invention first shown as a straight-line 1-stroke engine in FIG. 14 with a common, central shaft and two double-headed pistons.

The 4-stroke engine requires four power strokes or four 4-stroke piston assemblies to rotate the output shaft continuously or to complete a full cycle. The 2-stroke engine requires two power strokes or two 2-stroke piston assemblies to rotate the output shaft continuously or to complete a full cycle. A 1-stroke engine only requires one power stroke or one 1-stroke piston assembly in order to rotate the output shaft continuously or complete a full cycle. So the number of power strokes required to complete a full cycle is one significant difference between the present engine and a conventional engine. The power stroke per piston is the same 180° power stroke. The number of piston assemblies may decrease from conventional 4-stroke to 2-stroke to an embodiment of a 1-stroke engine of the present invention from 4 to 2 to 1 as does the number of crankshafts.

The currently used 4-stroke piston engine typically has four or more pistons and up to approximately five hundred parts. The 2-stroke engine may have half as many parts, and the DDMotion engine approximately 200 parts. As explained above, the conventional 4-stroke piston has four dedicated chambers during a piston cycle. The 1-stroke embodiment of the present invention also has four dedicated chambers, but the 2-stroke engine has one dedicated chamber. The 4-stroke engine has high fuel efficiency as does the 1-stroke embodiment of the present invention while a conventional 2-stroke engine has low fuel efficiency. The 4-stroke and 1-Stroke DDMotion engines have low emissions while the 2-stroke engine has a comparably high degree of emissions. The specific power ratio of a currently used 4-stroke engine is 1.0 because this conventional engine is selected as a reference. The conventional 2-stroke engine and the DDMotion 1-Stroke engine have specific power ratios of 1.5 and greater than 1.5 respectively. The conventional 4-stroke engine is typically used to power vehicles such as automobiles (cars). The currently used 2-stroke engine is used in small engines and power vehicles. The 1-Stroke DDMotion engine may be used in cars, as small engines and in power vehicles, even in power tractors and ships with multiple propellers.

The Wankel rotary engine has three pistons, roughly two hundred fifty parts, has dedicated chambers, a three hundred sixty degree power stroke/piston and has been used typically in automobiles (cars), i.e., the Mazda RX-7 and RX-8.

An embodiment of the present coordinated 1-stroke internal combustion engine invention will be described herein in two forms, a straight line and a rotary. The straight-line, by definition, has at least two pistons in order to form a straight line. The rotary version may have two or more pistons. Otherwise, the present internal combustion engine embodiments exhibit only about two hundred parts, have dedicated chambers and so exhibit high fuel efficiency and low emission. Their power stroke/piston may rotate the output shaft one hundred eighty degrees. Its specific power ratio may be increased over known engines to greater than 1.5. Its uses are practically unlimited: for example, vehicles (such as trucks or cars), snowmobiles, lawnmowers, motorcycles, locomotives and even to power large ships with multiple propellers.

Sprags (one way rotational gears, as will be further described below and are shown and described in U.S. Pat. No. 8,485,933 issued Jul. 16, 2013 and U.S. Pat. No. 8,641,570, incorporated by reference as to their entire contents) and gears, driver and gears or crankshaft control may be provided in a 1-Stroke DDMotion engine so that an output shaft continuously rotates in a desired rotational direction (clock-wise rotation or counter clock-wise rotation). A 180° power stroke cycle will be described and depicted from initial start (starting) through a full, repeating cycle whereby intake and exhaust chambers one through four of the four chambers are each filled with an air/fuel mixture, ignited and exhausted in such a manner that power is produced at great fuel economy. The simple engine of FIG. 14, 19 or 23 may be crankshaft controlled, gear and Sprag controlled (Sprag, herein, will be denoted with a capital "S" to generally indicate a one-way clutch or ratchet bearing as defined further below or per U.S. Pat. No. 8,641,570 or its equivalent to provide unidirectional output from two rotational direction input) or otherwise controlled.

The control technology as described herein as used in an embodiment of a DDMotion 1-Stroke or multiple stroke or opposed piston engine may be referred to as a ratchet bearing or a one-way clutch bearing introduced above as a Sprag. A Sprag is a trade name for such a bearing and is commercially available, for example, from Renold pie of the United Kingdom and from NMTG of India. Sprag may be used herein as a short-hand for such a bearing and assembly which is free-wheeling in one direction of rotation and engaged in the other rotation direction or its equivalent and may be referred to herein generally as output gears, for example, when discussing a Sprag application in one or more embodiments of an internal combustion engine with a 180° power stroke—rotary or linear/straight-line or opposed piston.

An external housing of such a ratchet or one-way clutch bearing (or Sprag) has a notch for receiving, for example, a needle roller such that when an internal race is moving in one rotational direction, the outer housing may move in either direction and be free-wheeling (or vice versa, if the outer housing rotates, the inner race may move) because the needle roller is loose or free-wheeling and located at one end of its associated notch. On the other hand, when the internal race rotates in the other rotational direction with respect to the outer housing or vice versa, the needle roller rolls into an engaged position between the race and the notch such that the housing is controlled to rotate in this other rotational direction with the race. A Sprag is also further described and shown in FIG. 4C of U.S. Pat. No. 8,388,481 issued Mar. 5, 2013 and incorporated by reference as to its entire contents.

Further features of the present embodiments include an output shaft rotation of 180° compared with, for example, two-stroke, rotary 360° and four-stroke 720° (FIG. 12). Also, described herein will be a simple sequenced cycle of a rotary engine where control may be provided via a rotary switch or electronic controls. The cycle may be remotely controlled with solenoids and may be designed in a rotary embodiment or a straight/linear embodiment. Output control, as suggested above may be via Sprags and employ a crankshaft, a rotary output, a driver and other gears for clockwise or counterclockwise output shaft rotation (forward and reverse). An opposed piston design will also be described, both straight-line and rotary.

These several technologies will be further described with reference to particular applications in automobiles, other vehicles and internal combustion engines generally having dedicated intake, compression, ignition/combustion and exhaust chambers in, for example, a 180° power 1-Stroke DDMotion engine. The several technologies are depicted in the drawings, a brief description of which follows.

BRIEF DESCRIPTION OF THE DRAWINGS

The features and advantages of the present invention will become more apparent from the detailed description set forth below when taken in conjunction with the drawings in which like reference numbers may indicate identical or functionally similar elements.

FIG. 11 (PRIOR ART) provides a table showing advantages and disadvantages of the Bourke, Schwiesow, Macey and Hofbauer engines which are known or in development.

FIG. 12 provides a further table entitled Engine Applications which compares conventional production or currently used 4-Stroke and 2-Stroke engines to a 1-Stroke DDMotion embodiment of the engine of the present invention. Principles of an embodiment of a 1-Stroke engine are described in FIGS. 13-16.

FIG. 13 provides a mechanical diagram of a first principle of creating four dedicated chambers for a 1-stroke engine wherein a cylinder housing having two chambers #1 and #2 separated by a center plate, the cylinder housing having nested in each chamber a double-headed piston to form four chambers A, B, C and D.

Figures 15, 16:
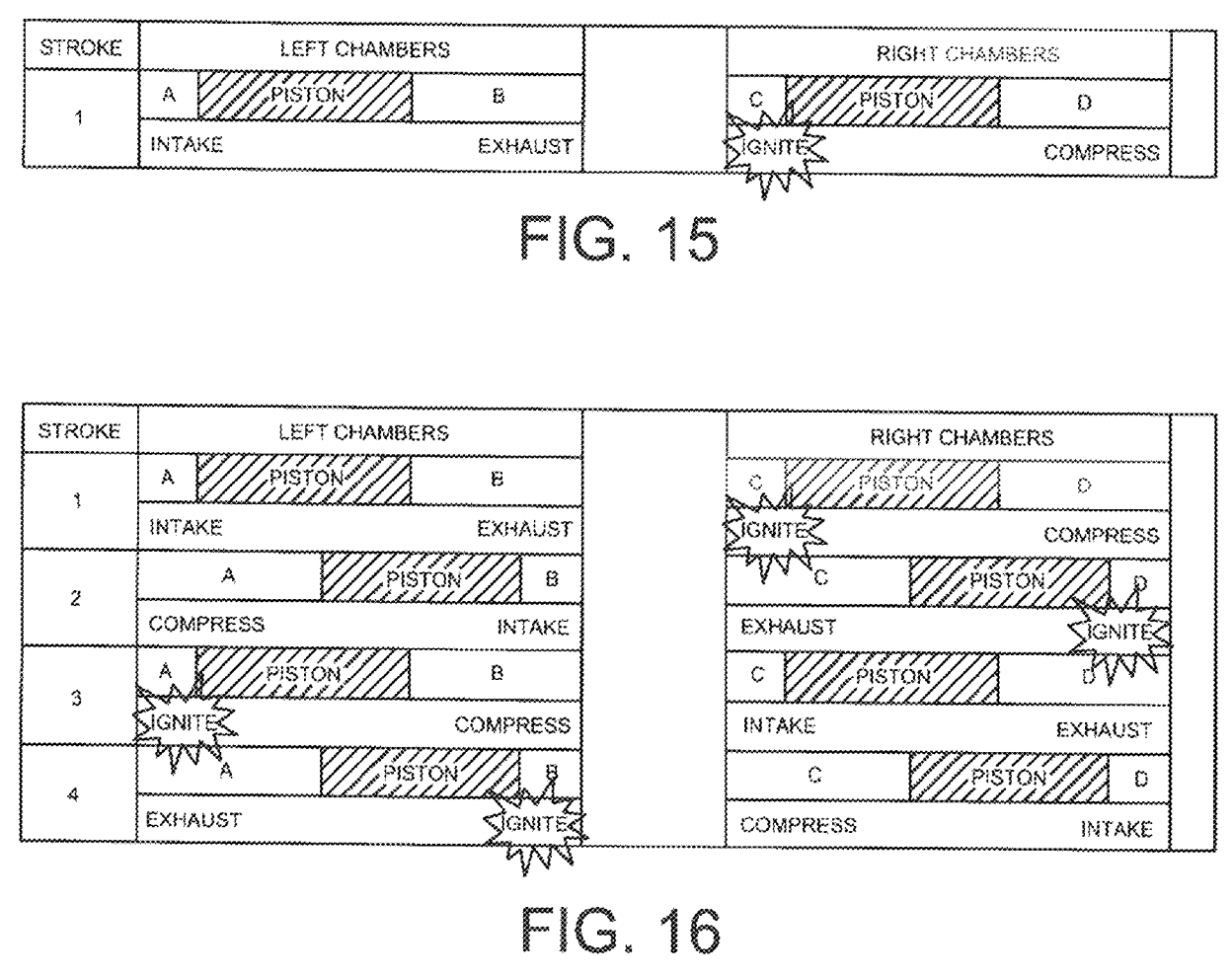

FIG. 15 provides a mechanical diagram of a third principle, to assign coordinated functions to the four chambers, for example, A may be intake, B may be exhaust, C may be ignition and D may be compression and have a coordinated cycle to move the shaft and pistons of FIG. 14 in a reciprocating motion and in such a coordinated cycle wherein intake means filling the dedicated chamber A with fuel while the chamber A is expanding, exhaust means chamber B discharges burned fuel as compression occurs, ignition means a spark plug is igniting compressed fuel in chamber C and compression means compression of the filled fuel and air mixture in chamber D. (An alternate assignment of coordinated functions is chamber A may be ignition, B may be exhaust, C may be intake and D may be compression.)

FIG. 16 provides a table showing a coordinated cycle of an embodiment of a 1-stroke engine expanding on the dedication of functions to chambers shown in FIG. 15 wherein after ignition in chamber C, ignition now occurs in chamber D at the same time as compression occurs in chamber A, intake occurs in chamber B and exhaust occurs in chamber C and so on to complete a conventional Otto cycle in four strokes, whereby a cycle of four strokes is repeated until the engine ignition is turned off.

FIG. 17(A) shows a conventional 4-stroke internal combustion engine known in the art with pistons #2 and #3 expanded and #1 and #4 compressed, the chamber for piston #2 being filled with air/gas mixture and chamber #4 showing the air/gas mixture having been ignited being exhausted to the right while chamber #1 has air/gas mixture compressed and ready for ignition; FIG. 17(B) shows a simplified schematic of FIG. 17(A) showing the piston, chamber arrangement; FIG. 17(C) shows a first step in realigning the typical 4-stroke engine moving pistons/chambers #1 and #4 to an opposite side of a crankshaft and piston/chambers #2 and #3 change places; FIG. 17(D) shows a step of aligning piston/chamber #1 and #3 and piston/chamber #2 and #4 so that a common shaft attaches the two pairs together for turning the crankshaft; and FIG. 17(E) shows aligning chambers #1 and #3 and #2 and #4 in a straight line to form an embodiment of a DDMotion 1-Stroke engine.

FIG. 18 provides a further table labeled Pistons and Engines with three columns for a conventional 4-stroke engine, a conventional 2-stroke engine and an embodiment of a DDMotion 1-Stroke engine overview wherein the columns provide a number and type of piston (the DDMotion i-Stroke embodiment having 2 double-headed pistons, no crankshaft or crankcase, four dedicated chambers, no shared chambers and its piston assembly as shown).

FIG. 19(A) shows a first embodiment of a straight/linear 1-Stroke DDMotion piston with four dedicated chambers A, B, C and D with two double-headed pistons joined by a common central shaft; FIG. 19(B) shows a second embodiment of a straight/linear 1-stroke DDMotion piston having the same four chambers and comprising two double-headed pistons but wherein the double-headed pistons are joined by external side rods, replacing the common, central shaft, but performing the same function, namely, to join the two double-headed pistons together.

FIG. 20(B) shows a next step of using an internal housing within an external housing and external rods to permit movement of the engine of FIG. 20(A) within an external housing to form a 1-stroke straight two-piston opposed piston, opposed cylinder (OPOC) engine; and FIG. 20(C) shows the removal of the internal housing, an increase in the number of pistons to five and a re-structuring of the external rods to comprise one external rod or two external rods (shown) joined to three of the five pistons to form the 1-Stroke straight five piston OPOC DDMotion embodiment.

2 joined by a cylindrical center portion which housing further comprises first and second opposite partitions forming four dedicated chambers A, B, C and D and wherein conventional valves and spark plugs may be installed in the partitions or to the cylindrical housing.

Figure 24:
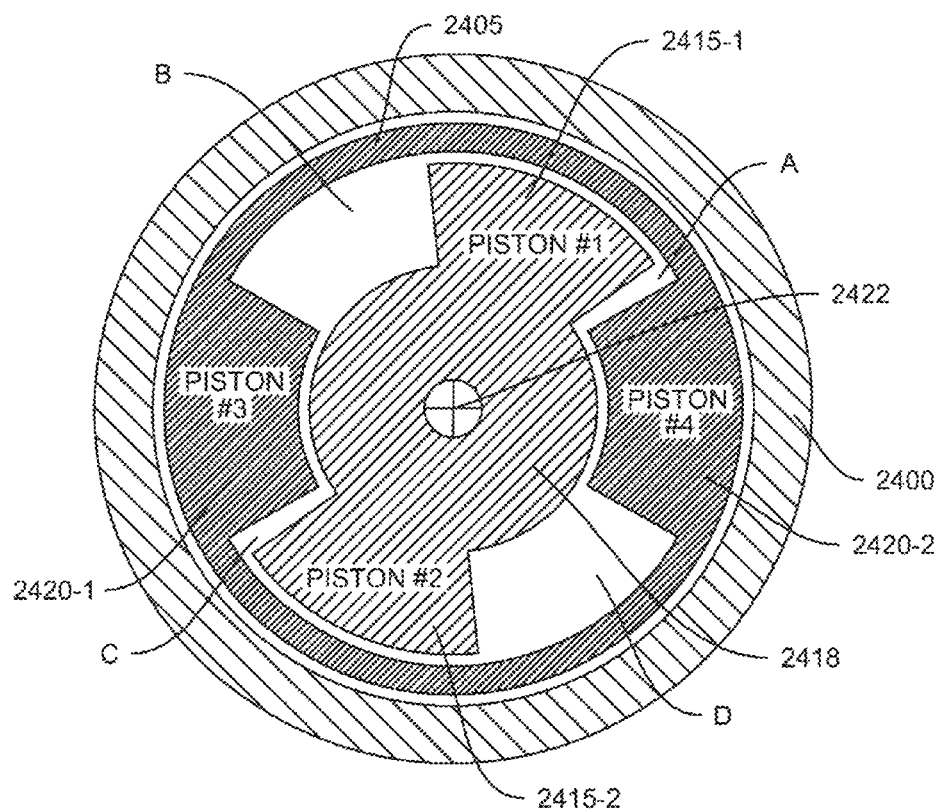

FIG. 24 shows a mechanical diagram of an embodiment of a DDMotion rotary piston opposed piston, opposed cylinder (OPOC) engine having a DDMotion 1-Stroke piston wherein the embodiment comprises four pistons, pistons #3 and #4 being integral with or attached to an internal cylindrical housing of an external cylindrical housing and pistons #1 and #2 are joined by a cylindrical center portion and central crankshaft forming four dedicated chambers A, B, C and D and wherein conventional valves and spark plugs may be installed to end plates of the external cylindrical housing (not shown).

Figure 25:
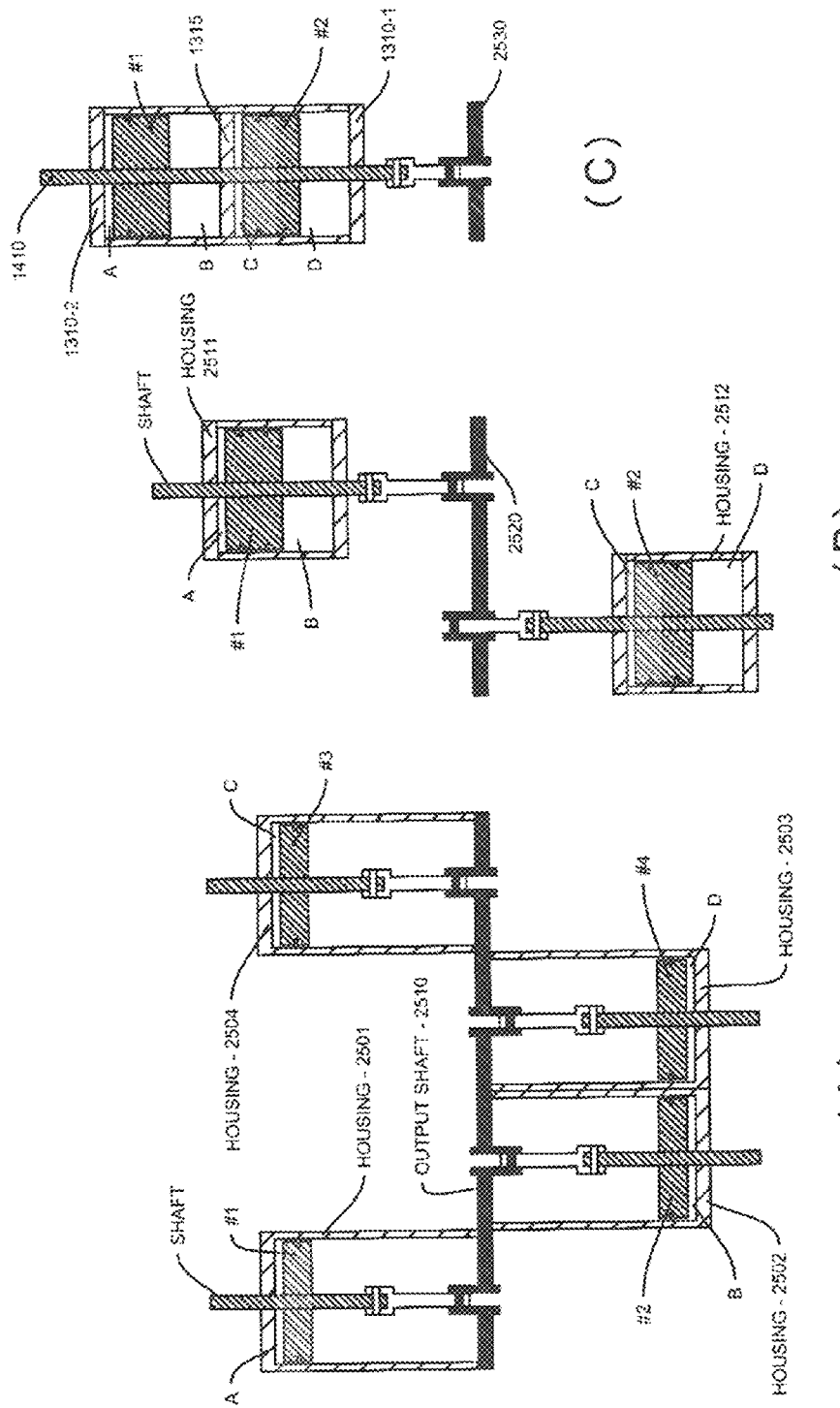

FIG. 25(A) through 25(C) show mechanical diagrams of alternative embodiments forming N-stroke pistons following the principles of a i-Stroke DDMotion engine wherein FIG. 25(A) is a mechanical diagram of a 4-stroke piston engine having four single-headed pistons #1, #2, #3 and #4, each housed in a separate housing and forming one dedicated chamber A each, and each having a central, common shaft coupled to a common crankshaft for turning an output shaft, pistons #1 and #3 being on opposing sides of the output shaft from pistons #3 and #4; FIG. 25(B) shows a mechanical diagram of a 2-stroke piston engine having two double-headed pistons #1 and #2 forming two dedicated chambers A and B, C and D, each within their own housings aligned on opposing sides of a central common output shaft and each piston having a central common shaft for driving the output shaft; and FIG. 25(C) shows an embodiment of a DDMotion 1-Stroke engine having two double-headed pistons #1 and #2 within a cylindrical housing and forming a straight linear engine with four dedicated chambers A, B, C and D showing that a principle of the present invention is that the present DDMotion 1-stroke engine may be expanded to become an N-stroke engine of N strokes where N may be 1, 2, 4 or larger number of pistons—single or double-headed with dedicated chambers.

Figure 26:
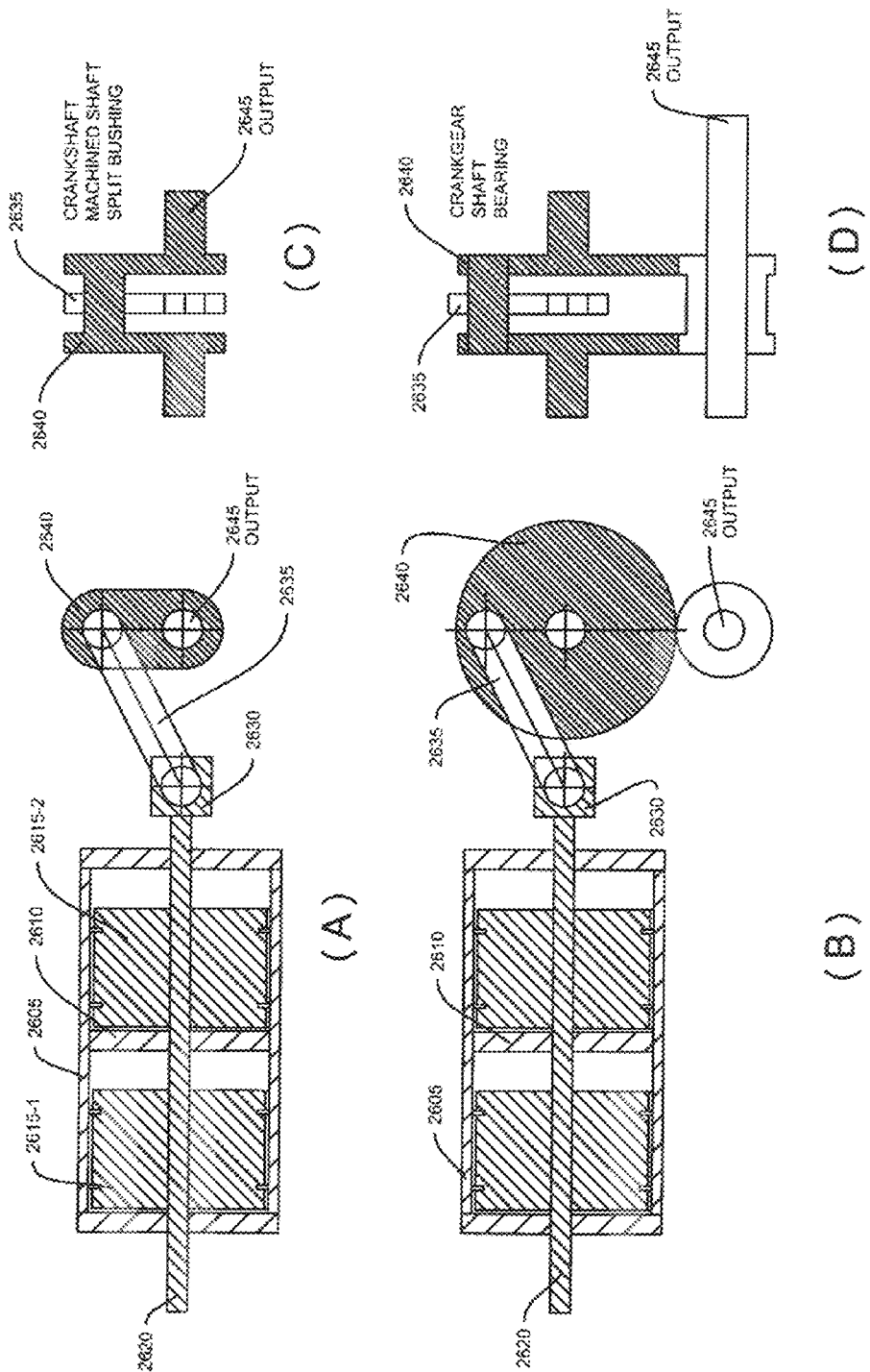

FIG. 26(A) through FIG. 26(D) show alternate means of coupling a 1-stroke, central common shaft, two double-headed cylinder embodiment of the present invention, wherein FIG. 26(A) and FIG. 26(C) show a side view and an overhead view of a crankshaft machined shaft split bushing embodiment respectively for coupling a 1-stroke engine to produce an output and FIG. 26(B) and FIG. 26(D)) show a side view and an overhead view of a Crankgear shaft bearing embodiment respectively for coupling a 1-stroke engine to produce an output.

Figure 27:
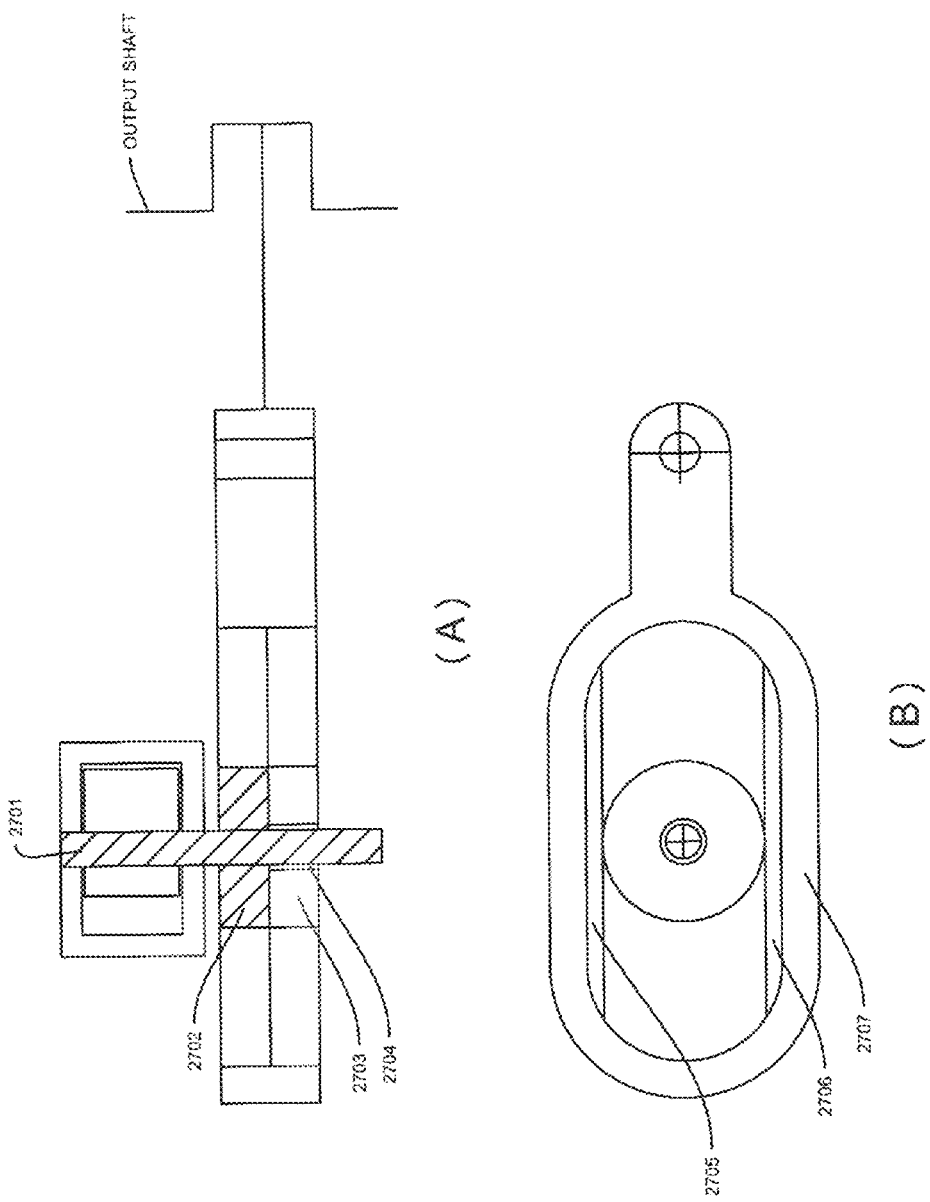

FIGS. 27(A) and (B) show corresponding overhead and side views of a drivers and gears controlled piston output to an output shaft (FIG. 27(A)) wherein FIG. 27(A) shows a mechanical diagram including a 1-Stroke DDMotion engine embodiment coupled to a driver and gear output control and FIG. 27(B) shows a side view where more particular detail is shown of the driver and gear control for reciprocating movement and driving the output shaft of FIG. 27(A).

FIGS. 28(A) and (B) show corresponding side and overhead views of a gears and Sprags controlled piston output of a DDMotion 1-Stroke or other engine embodiment wherein FIG. 28(A) shows the gears and Sprags and FIG. 28(B) provides an overhead mechanical diagram showing the central, common shaft input from a piston of, for example, a 1-stroke engine embodiment and the uni-directional output given the reciprocating input as well as first and second outputs.

Figure 29:
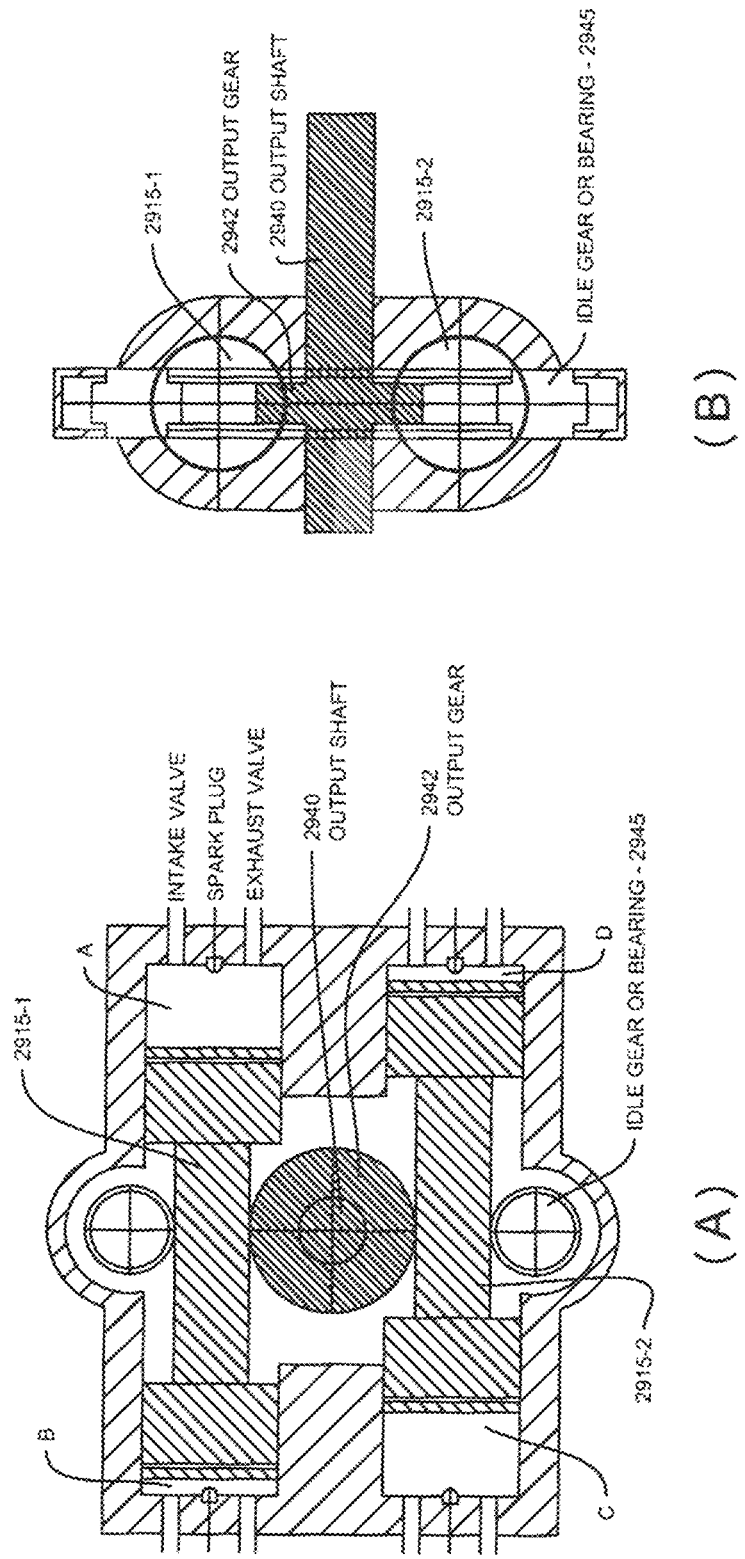

FIG. 29(A) and FIG. 29(B) comprise side view and end view mechanical diagrams wherein FIG. 29(A) shows two double-headed pistons forming dedicated chambers A, B, C and D of a DDMotion i-Stroke embodiment with intake valve, spark plugs and exhaust valves indicated in a housing having a central, common, output gear and shaft (and an idle gear or bearing) and FIG. 29(B) shows the double-headed pistons in side view with the output shaft 2940 extending to the right from the housing.

Figure 30:
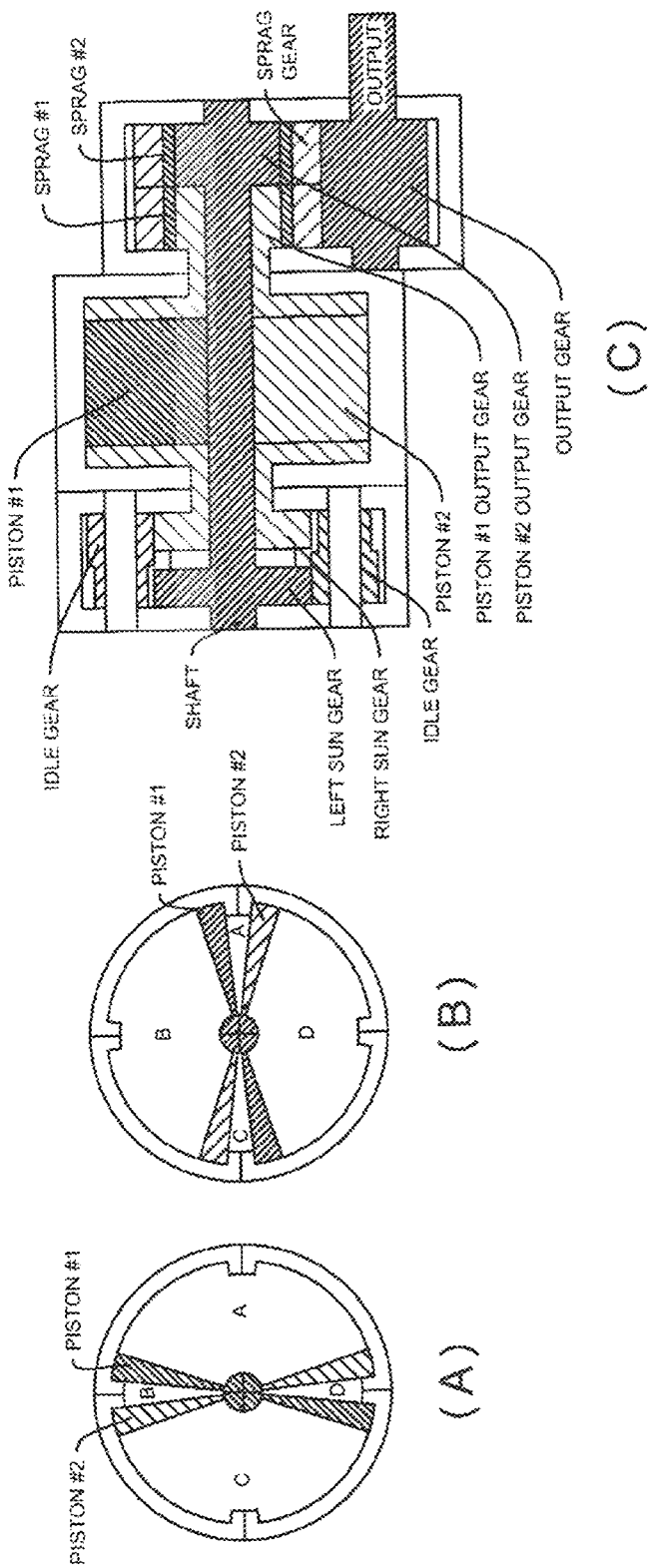

FIG. 30(A) through FIG. 30(C) comprise mechanical diagrams showing a 1-stroke rotary opposed piston embodiment of the present engine invention with Transgear™ gear assembly control, wherein FIGS. 30(A) and FIG. 30(B) each shows piston #1 in filled shading and piston #2 in slanted line shading with dedicated chambers A, B, C and D numbered and showing reciprocating movement whereby chambers B and D are initially compressed in FIG. 30(A) and expanded in FIG. 30(B) and wherein FIG. 30(C) is a cross-sectional view vertically through FIG. 30(A) and shows the common, central reciprocating input shaft with piston #1 and piston #2 indicated, Sprag #1 and Sprag #2 and sun and output gears among other gears indicated to control and provide a uni-directional output of a Transgear controlled reciprocating rotary opposed piston embodiment of the present engine invention.

Figure 31:
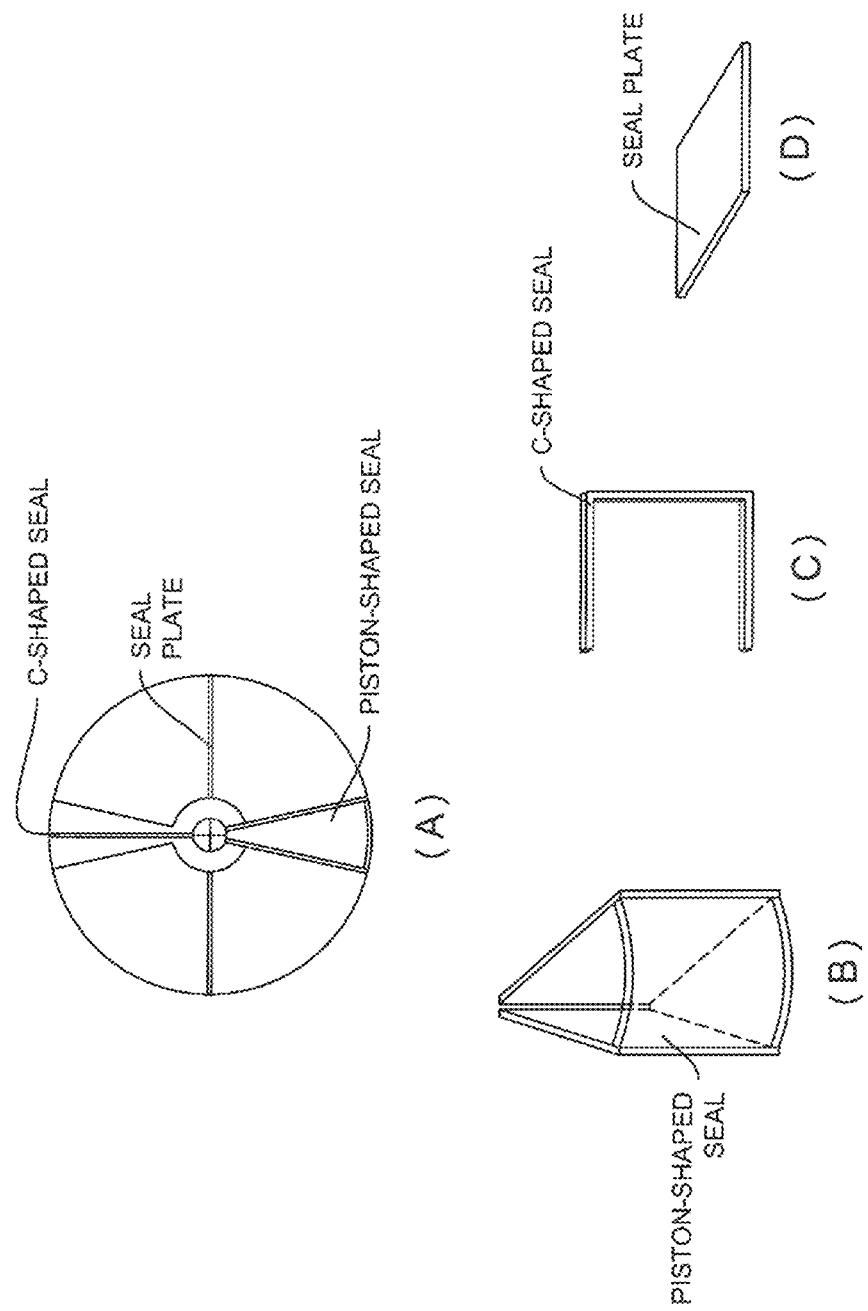

FIGS. 31(A), FIG. 31(B) and FIG. 31(C) show exemplary embodiments for rotary piston seals wherein FIG. 31(A) shows a rotary 1-stroke piston engine embodiment with seal plates and C-shaped seal and piston-shaped seal installed in a rotary 1-stroke engine of the present invention; FIG. 31(B) shows details of the piston-shaped seal of the rotary engine of FIG. 31(A); FIG. 31 (C) shows details of a C-shaped seal; and FIG. 31(D) shows details of a seal plate of the rotary engine of FIG. 31(A).

These applications of variations and technologies of novel internal combustion engines with respect to various embodiments will be further described in the detailed description of the drawings which follows.

DETAILED DESCRIPTION

Figure 1:
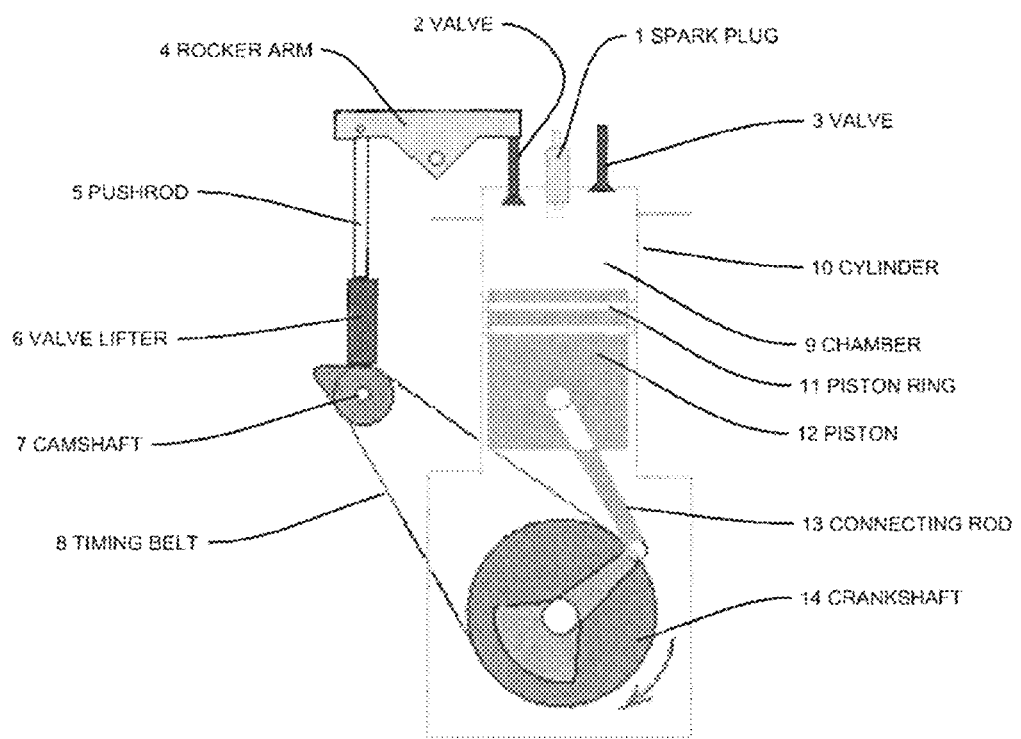
FIG. 1 (PRIOR ART) comprises a cross-sectional view of a known four-stroke straight piston comprising valves, a chamber, a piston, a cylinder, and a connecting rod connecting the piston to a crankshaft and a timing belt connecting the crankshaft to a camshaft.
Figure 2:
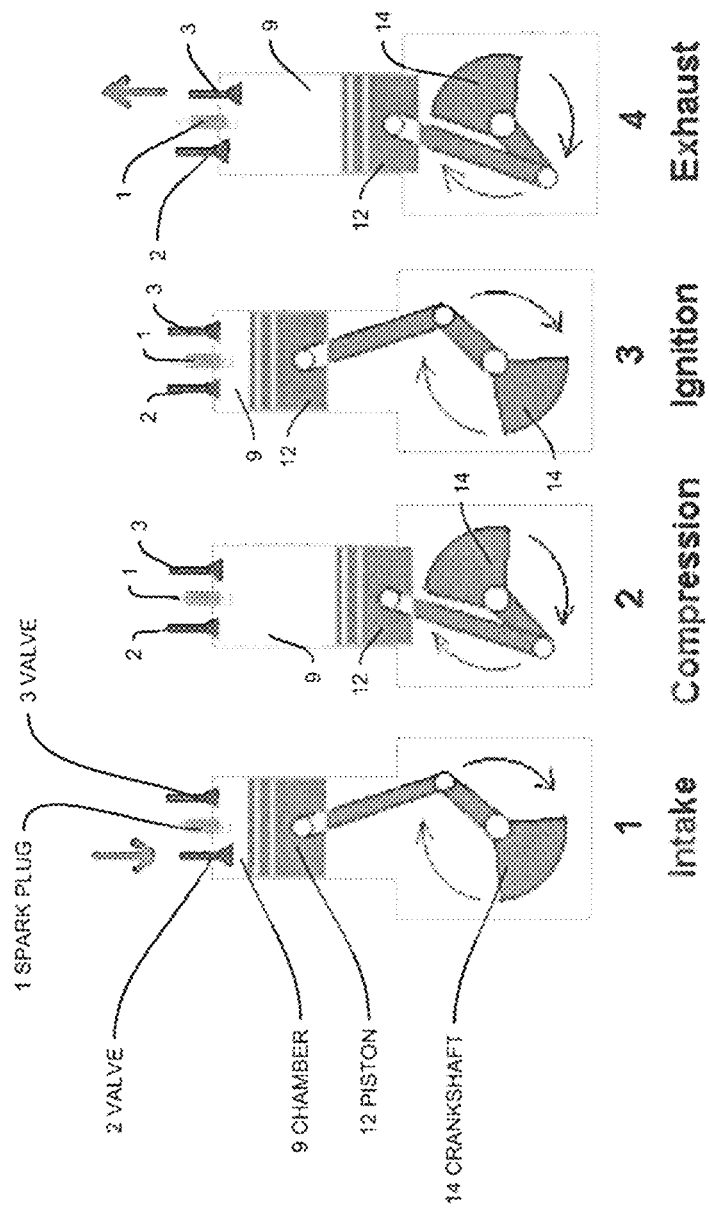
FIG. 2 (PRIOR ART) shows a complete four stroke cycle employing the four-stroke straight piston of FIG. 1.
Figure 3:
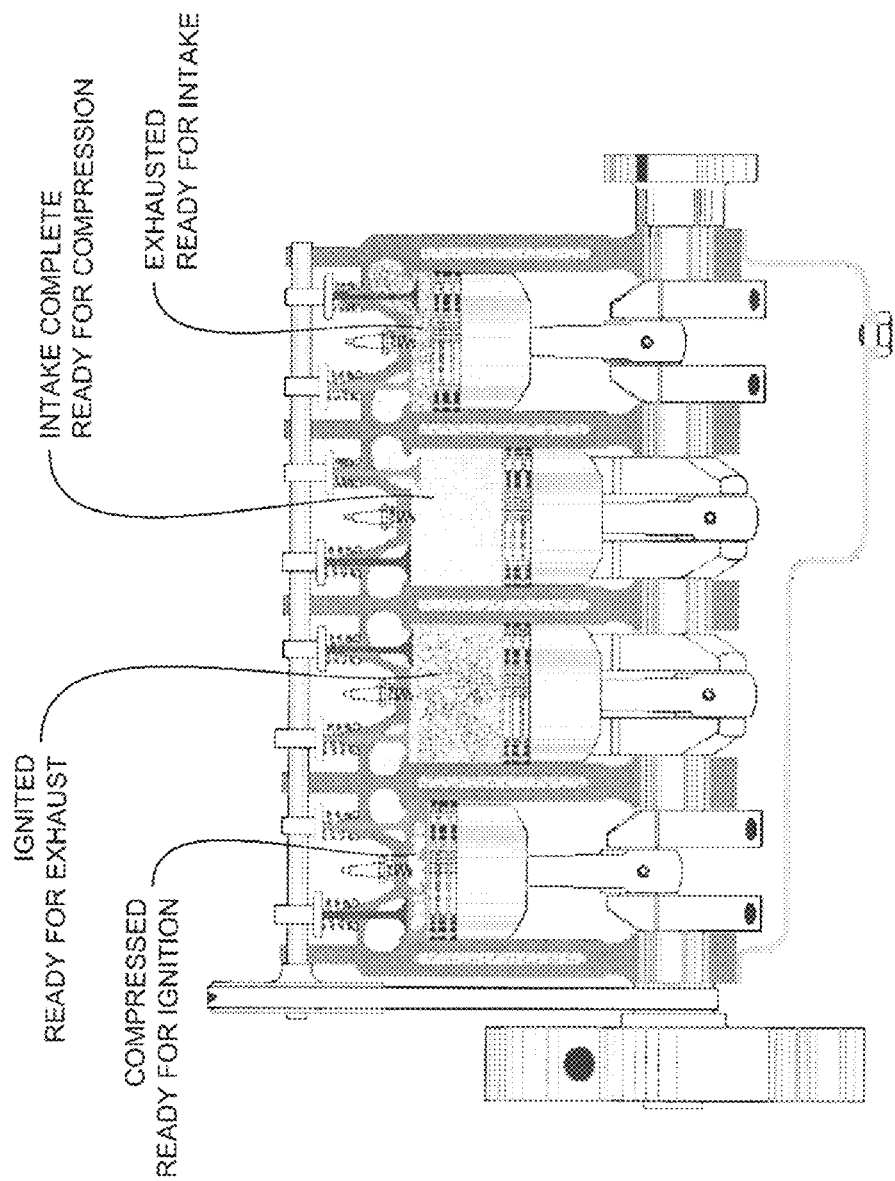
FIG. 3 (PRIOR ART) shows a known internal combustion engine with four "Four-stroke" pistons of FIG. 1.
Figure 4:
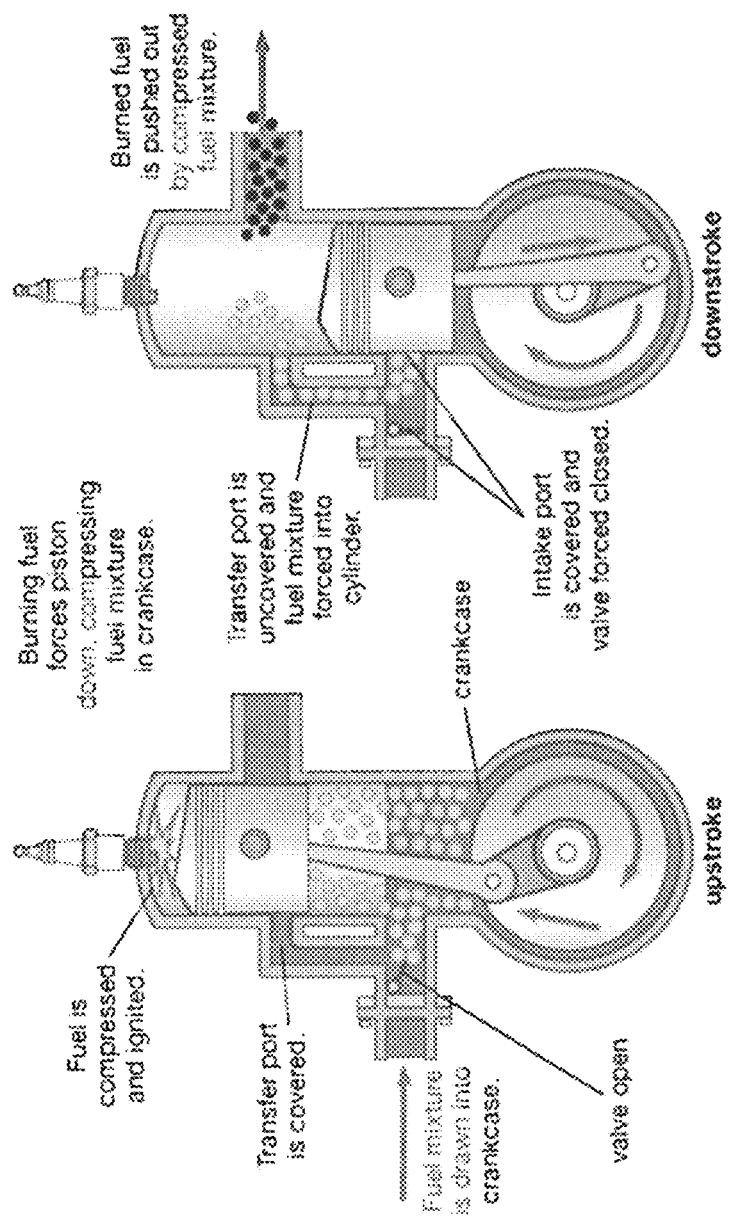
FIG. 4 (PRIOR ART) shows a known two-stroke piston in upstroke and downstroke views.
Figure 5:
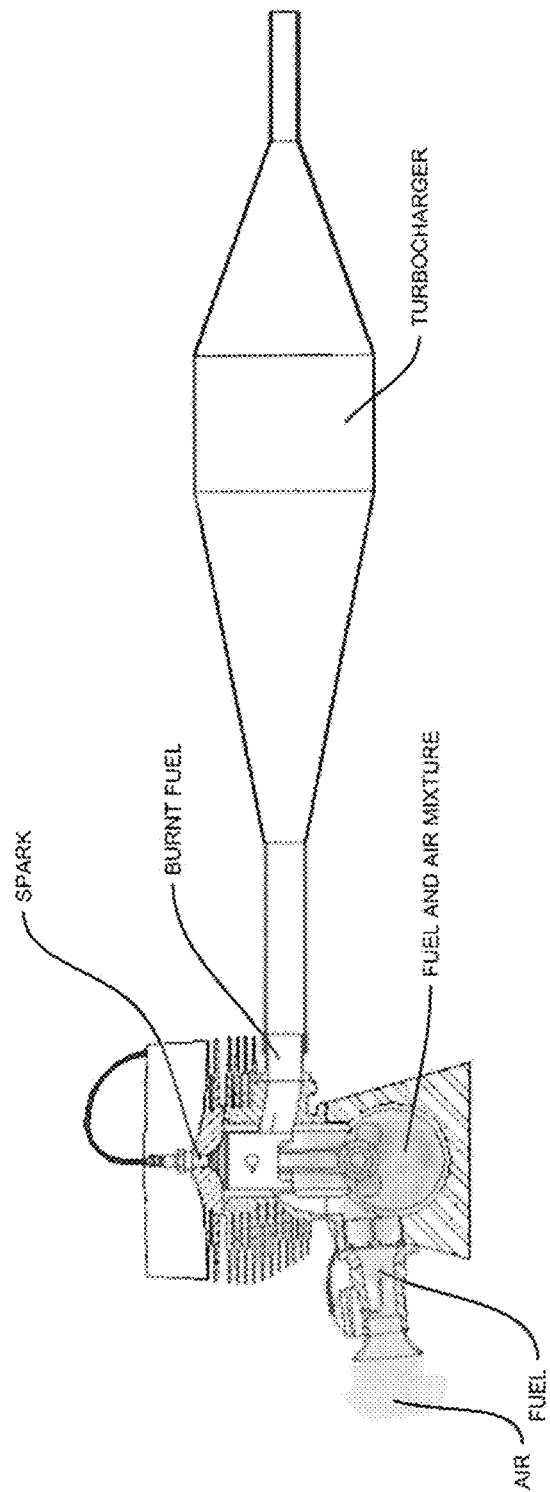
FIG. 5 (PRIOR ART) shows a conventional two-stroke engine with a turbocharger.
Figure 6:
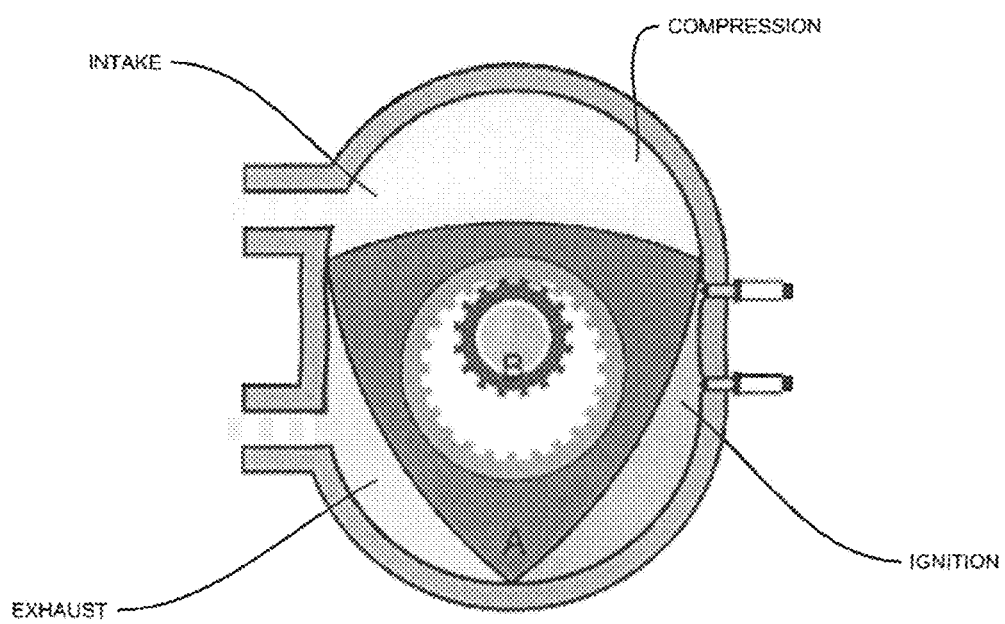
FIG. 6 (PRIOR ART) shows a conventional (Wankel) rotary engine in cross-section.
Figure 7:
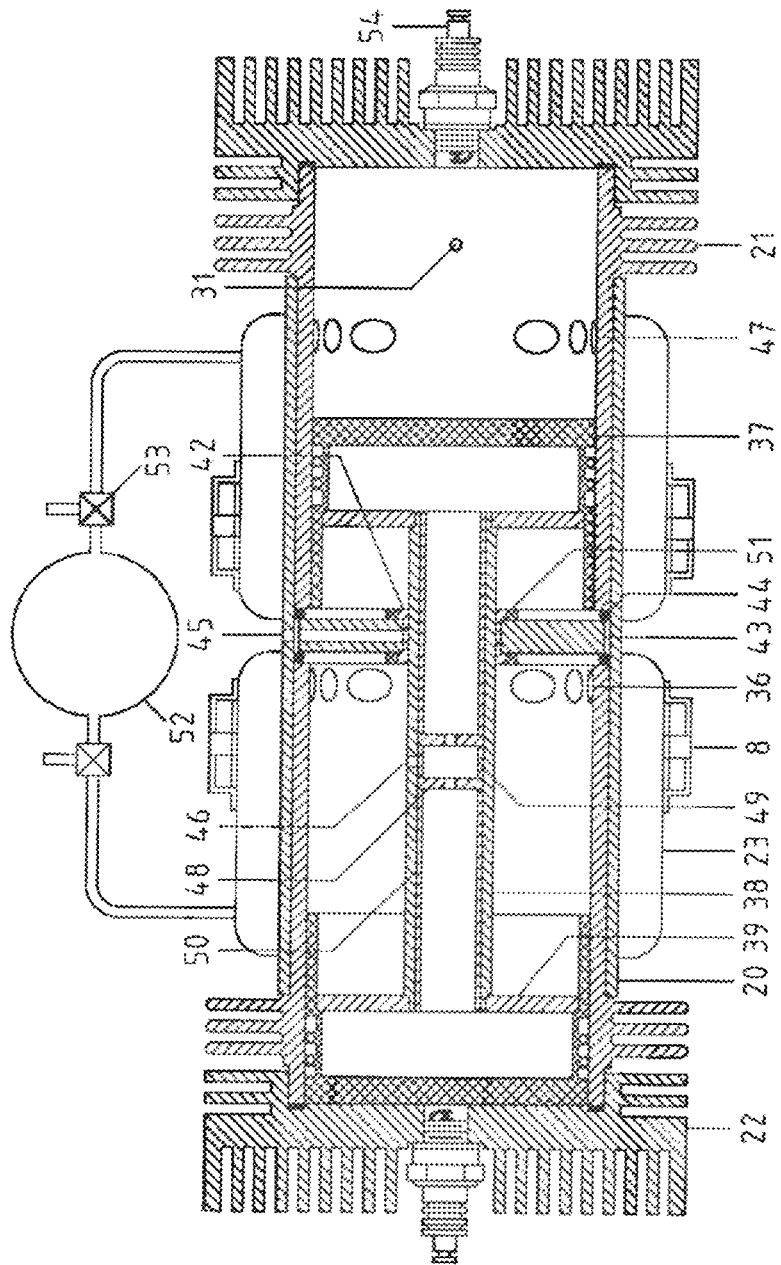
FIG. 7 (PRIOR ART) shows the known Schwiesow engine with double-acting "Two-stroke" pistons that move from one side to the other when alternating ignition occurs.
Figure 8:
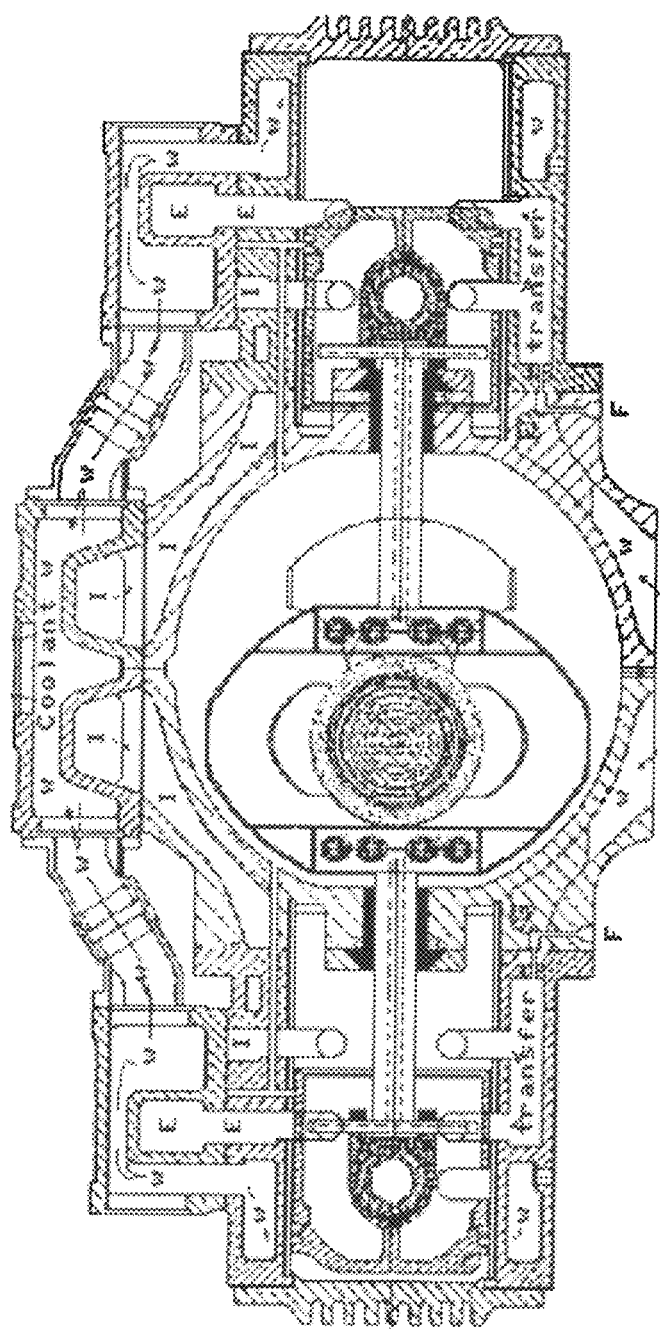
FIG. 8 (PRIOR ART) shows the known Bourke engine in some detail having four "Two-stroke" pistons.
Figure 9:
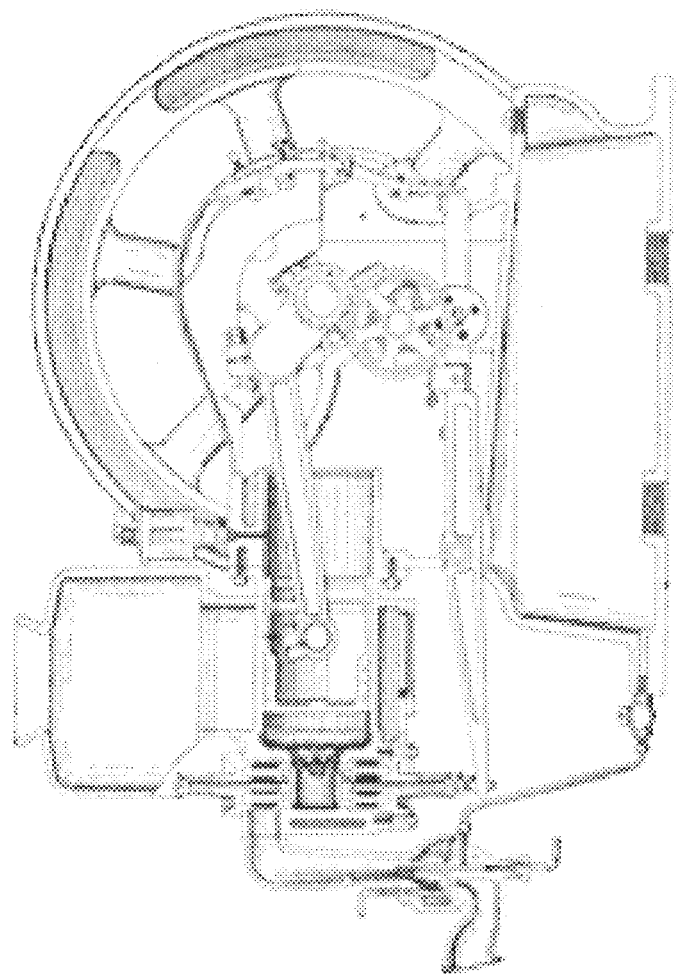
FIG. 9 (PRIOR ART) shows the known Massey-Harris engine having a rotary two stroke piston.
Figure 10:
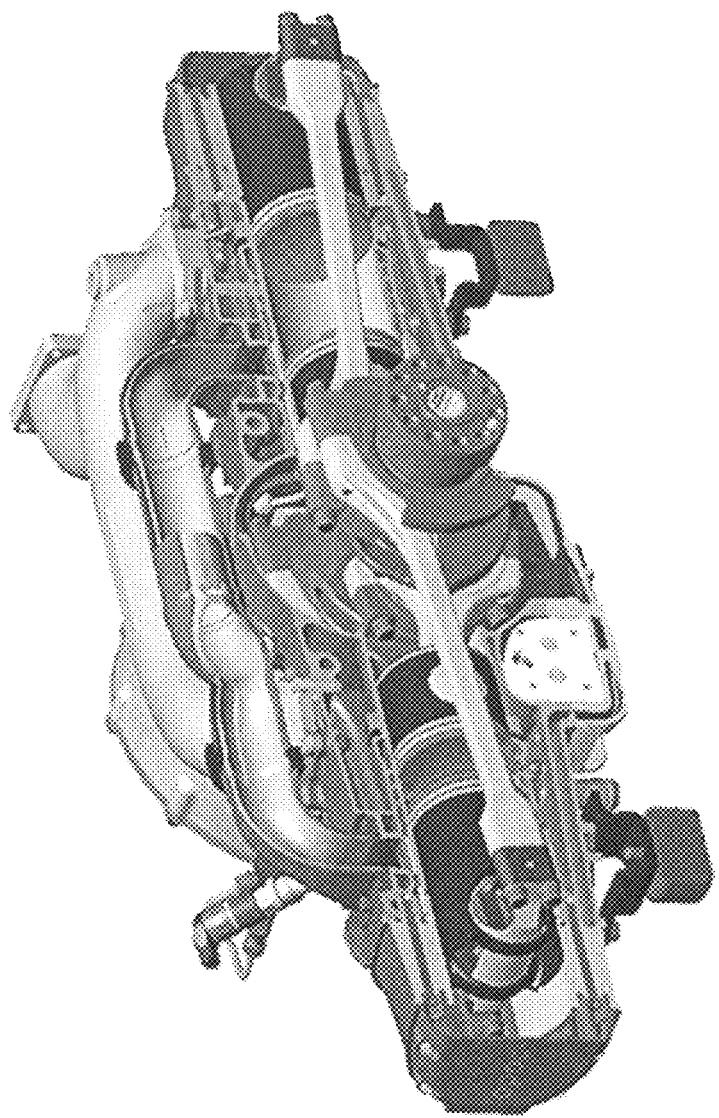
FIG. 10 (PRIOR ART) shows the known Hofbauer engine, a supercharged opposed piston, opposed cylinder (OPOC) two stroke internal combustion engine.
Figure 14:
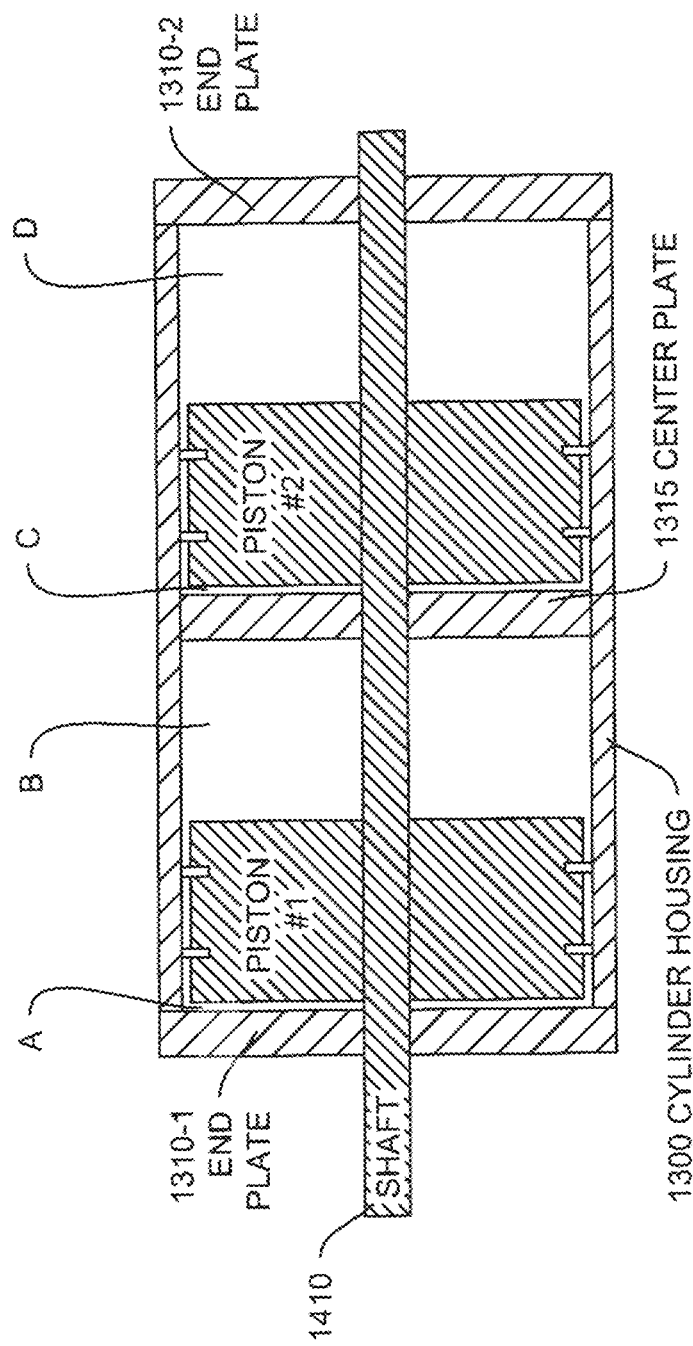
FIG. 14 provides a mechanical diagram of a second principle, to actuate the four chambers A, B, C and D simultaneously, for example, by tying the two double-headed pistons together via a central common shaft (or external rods, not shown). An ignition in any of the chambers A, B, C or D actuates both pistons to move either to the left or to the right, simultaneously capable of performing four functions per each stroke.
Figure 17:
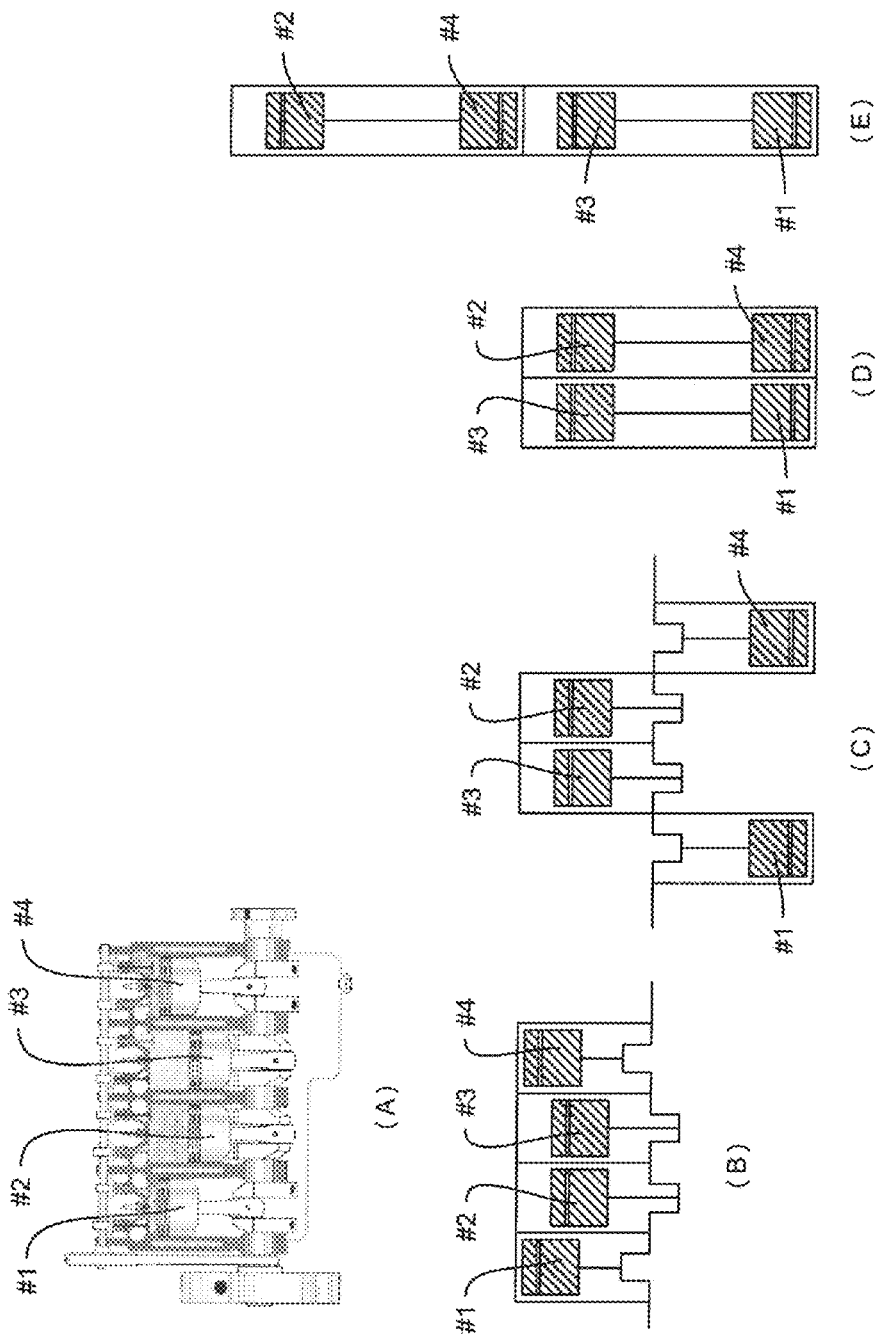
FIG. 17(A) to FIG. 17(E) provide a series of mechanical diagrams explaining a theory of how a conventional 4-stroke engine may be compared and differences indicated in a series of steps of conversion from a conventional 4-Stroke engine to a DDMotion 1-Stroke engine whereby
Figure 20:
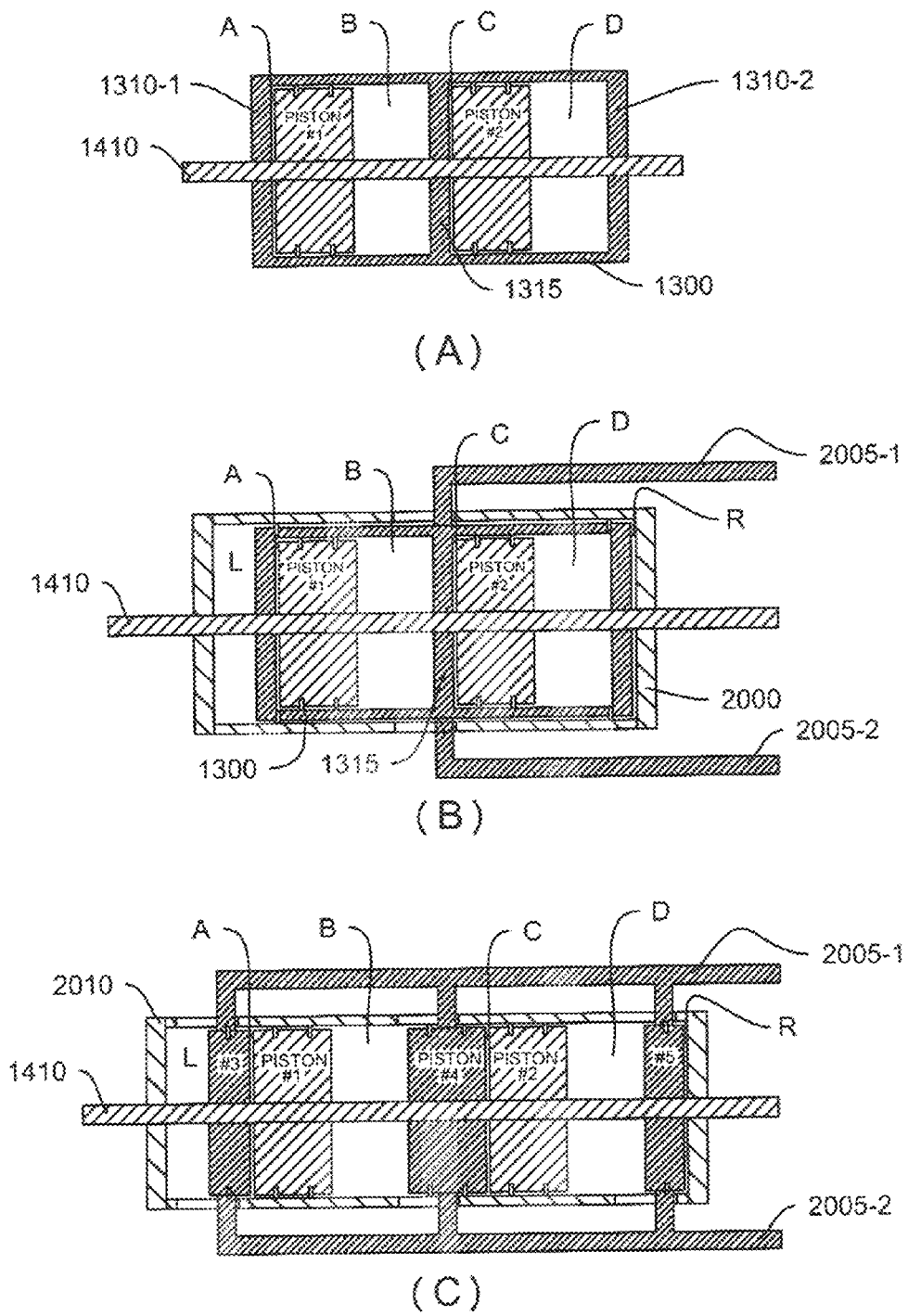
FIG. 20(A) through FIG. 20(C) show the development of an opposed piston, opposed cylinder (OPOC) embodiment of FIG. 20(C) comprising five pistons and four chambers wherein FIG. 20(A) provides a simplified mechanical diagram of an embodiment of a DDMotion 1-Stroke straight two double-headed pistons.

The present invention is directed to applications of, for example, a reciprocating straight or rotary piston in a reciprocating straight or rotary internal combustion engine, straight line embodiments having more than 1-stroke and opposed piston straight and rotary embodiments and various aspects and embodiments will be described with reference to FIGS. 12-31 wherein FIG. 12 provides typical engine applications of the present invention; FIGS. 13-15 show the principles of development of a i-Stroke DDMotion embodiment and FIG. 16, a 1-stroke engine cycle. FIG. 17 shows how to rearrange a 4-stroke engine to be a 1-stroke engine. FIG. 18 shows a piston and engine table. FIGS. 19-31 show further mechanical diagrams of straight-line and rotary, 1-stroke and N-stroke and opposed piston embodiments and controls.

Referring first to FIG. 12, FIG. 12 provides a table entitled Engine Applications which compares conventional production or currently used 4-Stroke and 2-Stroke engines to a 1-Stroke embodiment of the engine of the present invention. An embodiment of reciprocating double-headed pistons joined by a common, central shaft forming dedicated chambers A, B, C and D is first shown in FIG. 14 within what may typically comprise a cylinder housing having end plates as a typical 1-Stroke DDMotion engine. Referring briefly to FIG. 12 showing a table entitled ENGINE APPLICATIONS of internal combustion engines, there are shown on the left, conventional or currently used internal combustion engines that are in production and are discussed above including, a conventional or currently used 4-stroke piston engine and a conventional 2-stroke piston engine. The table is intended to provide the reader with some insight into differences between conventional engines and an embodiment of a 1-stroke engine of the present invention. To the right is represented data for an exemplary embodiment of the current invention, a 1-Stroke engine of assignee Differential Dynamics Corporation or DDMotion as shown first in FIG. 14.

The 4-stroke engine requires four power strokes or four 4-stroke piston assemblies to rotate the output shaft continuously or to complete a full cycle. The 2-stroke engine requires two power strokes or two 2-stroke piston assemblies to rotate the output shaft continuously or to complete a full cycle. A 1-stroke engine only requires one power stroke or one 1-stroke piston assembly in order to rotate the output shaft continuously or complete a full cycle. So the number of power strokes required to complete a full cycle is one significant difference between the present engine and a conventional engine. The power stroke per engine is the same 180° power stroke. The number of piston assemblies may decrease from conventional 4-stroke to 2-stroke to an embodiment of a 1-stroke engine of the present invention from 4 to 2 to 1 as does the number of crankshafts.

The currently used 4-stroke piston engine typically has four or more pistons and up to approximately five hundred parts. The 2-stroke engine may have half as many parts, and the DDMotion engine may have approximately 200 parts. As explained above, the conventional 4-stroke piston has dedicated chambers during a piston cycle. The 1-stroke embodiment of the present invention also has dedicated chambers, but the 2-stroke engine has one dedicated chamber. The 4-stroke engine has high fuel efficiency as does the 1-stroke embodiment of the present invention while a conventional 2-stroke engine has low fuel efficiency. The 4-stroke and 1-Stroke DDMotion engine have low emissions while the 2-stroke engine has a comparably high degree of emissions. The specific power ratio of a currently used 4-stroke engine is 1.0 because this engine is selected as a reference. The conventional 2-stroke engine and DDMotion 1-Stroke engine have specific power ratios of 1.5 and greater than 1.5 respectively. The conventional 4-stroke engine is typically used to power vehicles such as automobiles (cars). The currently used 2-stroke engine is used in small engines and power vehicles. The 1-Stroke DDMotion engine may be used in cars, as small engines and in power vehicles, even to power tractors and ships with multiple propellers.

The Wankel rotary engine has three pistons, roughly two hundred fifty parts, has dedicated chambers, a three hundred sixty degree power stroke/piston and has been used typically in automobiles (cars), i.e., the Mazda RX-7 and RX-8.

An embodiment of the present coordinated 1-stroke internal combustion engine invention is shown in FIG. 14 and will be described herein in two forms, a straight line and a rotary. The straight-line, by definition, has at least two pistons in order to form a straight line. The rotary version may have 1, 2 or more pistons. Otherwise, the present internal combustion engine embodiments exhibit only about two hundred parts, has dedicated chambers and so exhibits high fuel efficiency and low emission. Its power stroke/piston may rotate the output shaft one hundred eighty degrees or move the piston in one direction in a housing. Its specific power ratio may be increased over known engines to close to 2.0, i.e. greater than 1.5. Its uses are practically unlimited: for example, vehicles (such as trucks or cars), snowmobiles, lawnmowers, motorcycles, locomotives and even to power large ships with multiple propellers.

FIGS. 13(A) through 15 show three principles of development of a coordinated cycle, 1-stroke engine of the present invention. FIG. 13(A) provides a mechanical diagram of a first principle of creating four dedicated chamber for a 1-stroke engine. To create four dedicated chambers, a cylindrical housing may have two chambers #1 and #2 separated by a center plate 1315, the cylindrical housing, having nested in each chamber a double-headed piston, to form four chambers A, B, C and D per FIG. 13(B). In particular, FIGS. 13(A) and FIG. 13(B) each shows a cylinder housing 1300 having left end plate 1310-1 and right end plate 1310-2 which are for sealing the ends of the cylinder housing 1300. Cylinder housing 1300 may be a cylindrical housing, have an elliptical cross-section or a square or rectangular cross-section depending on the cross-sectional shape of the pistons within. A center plate 1315 divides the cylinder housing 1300 into chamber #1 and chamber #2 (FIG. 13(A)). FIG. 13(B) shows FIG. 13(A) with two double-headed pistons #1 and #2 added, one in each of chamber #1 and chamber #2 of FIG. 13(A). Piston #1 divides chamber #1 into chamber A (shown compressed) and chamber B shown expanded. Piston #2 divides Chamber #2 into chamber C (shown compressed) and chamber D (shown expanded).

Referring to FIG. 14, FIG. 14 shows a second principle of 1-stroke engine development whereby chambers A, B, C and D are actuated simultaneously. A double-headed piston #1 having been added to chamber #1 and a double headed-piston #2 having been added to chamber #2, these are tied together by central common shaft 1410 which may be attached to or integral with the pistons. In FIG. 14, it may now be seen that by adding pistons #1 and #2, the two original chambers #1 and #2 are further divided by the two pistons to form four chambers A, B, C and D which pistons are actuated simultaneously by shaft 1410. The chambers A, B, C and D may be dedicated to functions as described in accordance with the third principle of development.

This occurs by joining the first and second double-headed pistons by fixed means such as a common central shaft 1410, still leaving chambers A, B, C and D (A and C compressed and B and D expanded but not yet dedicated to functions). The central common shaft 1410 may extend to the left, to the right or both to the left and to the right sides and so each side of shaft 1410 may be used to provide reciprocating motion toward an output. In an alternative embodiment to be discussed herein, the central, common shaft may be replaced or supplemented by external to the housing rods first shown in FIG. 19(B). Similarly, these external rods may extend to the left, to the right or both to the left and to the right. Pistons #1 and #2 move from left to right in reciprocating motion along with shaft 1410. An ignition in any chamber will actuate both pistons to move. Four functions (intake, exhaust, ignition and compression) are simultaneously performed per one stroke (movement to the left or movement to the right, for example)—the third principle of 1-stroke engine development.

FIG. 14 provides a mechanical diagram of the second principle, to actuate the four chambers A, B, C and D simultaneously, for example, by tying the two double-headed pistons together via the central common shaft 1410 (or external rods, not shown). An ignition in any of the chambers A, B, C or D actuates both pistons to move either to the left or to the right, simultaneously, where the four chambers A, B, C and D are capable of performing four functions per each stroke (from the left to the right, for example).

FIG. 15 provides a mechanical diagram and associated table of the third principle, to assign coordinated functions to the four chambers, for example, chamber A may be intake, chamber B may be exhaust, chamber C may be ignition and chamber D may be compression in a given stroke of a cycle and have a coordinated cycle to move the shaft and pistons of FIG. 14 in a reciprocating motion and in such a coordinated cycle, wherein "intake" means filling the dedicated chamber A with fuel/air mixture while the chamber A is expanding, "exhaust" means chamber B discharges burned fuel as compression of the piston occurs, "ignition" means a spark plug is igniting compressed fuel and air mixture in chamber C and "compression" means compression of the filled fuel and air mixture in chamber D. The pistons are shown moved to the left. But on starting an engine, the pistons can be found in any position between and including a left-most and a right-most position. So if ignition occurs of a fuel/air mixture in chamber C, wherever the two pistons are, (except if they are in a right-most position) they will be encouraged because of the ignition of the fuel-air mixture to move together to the right. An alternate assignment of coordinated functions to chambers may be that chamber A may be ignition, chamber B may be exhaust, chamber C may be intake and chamber D may be compression.

FIG. 16 provides a cycle table of a 1-stroke engine embodiment of the present invention showing a coordinated cycle (Otto cycle) of an embodiment of a 1-stroke engine expanding on the dedication of functions to chambers shown in FIG. 15. After an ignition function in chamber C in a first stroke, ignition in a second stroke now occurs in chamber D at the same time as compression is assigned to chamber A, intake is assigned to chamber B and exhaust is assigned to chamber C and so on to complete a conventional Otto cycle in four strokes, whereby a cycle of four strokes is repeated. The first stroke moves the two joined double-headed pistons to the right; the second to the left and so on. Continuing the discussion, in the third piston stroke, ignition occurs in chamber A, compression in chamber B, intake in chamber C and exhaust in chamber D. Finally, in the fourth and final stroke of an Otto cycle, ignition occurs in chamber B, exhaust in chamber A, compression in chamber C and intake in chamber D. The Otto cycle of four piston strokes repeats.

Chamber A shown in FIG. 13(B) comprises a cavity and a volume not filled by the reciprocating piston (acting as a divider) of the cross-sectional volume of the cylindrical housing. Similarly, chamber B shown in FIG. 13B comprises a cavity and a volume not filled by another reciprocating piston. In FIG. 13B, chambers #1 and #2 of FIG. 13(A) are shown filled with two double-headed pistons separating each of chambers #1 and #2 into four chambers, A, B, C and D, two chambers (A and C) being compressed and two chambers, (B and D) being expanded. Spark or ignition can occur in either chamber A or chamber C to cause the two pistons joined by shaft 1410 per FIG. 14 to move together to the right.

FIG. 17(A) to FIG. 17(E) provide a series of mechanical diagrams explaining a theory of how a conventional 4-stroke engine may be compared and differences indicated in a series of steps of conversion from a conventional 4-Stroke engine to a DDMotion 1-Stroke engine. In particular, referring first to FIG. 17(A), there is shown a conventional 4-stroke internal combustion engine known in the art with pistons #2 and #3 lowered (chambers expanded) and #1 and #4 raised (chambers compressed). The chamber for piston #2 is shown filled with air/gas mixture and chamber #4 shows the air/gas mixture having been ignited being exhausted to the right. Chamber #1 has air/gas mixture compressed and ready for ignition.

Referring now to FIG. 17(B), there is shown a simplified schematic of FIG. 17(A) showing the pistons #1, #2, #3 and #4 and chamber arrangement with pistons #1, #2, #3 and #4 being the same positions in FIG. 17(B) as in FIG. 17(A).

FIG. 17(C) shows a first step in realigning the typical 4-stroke engine of FIG. 17(A) or (B). One moves pistons/chambers #1 and #4 to an opposite side of an output shaft, resulting in Pistons #1 and #4 being on the bottom of the output shaft and pistons #2 and #3 being on the top and changing places so the pistons are in the order #1, #3, #2, #4 in FIG. 17(C). FIG. 17(D) shows a step of aligning piston/chamber #1 and #3 opposite one another and piston/chamber #2 and #4 opposite one another so that a central, common shaft attaches the two pairs of pistons together (no output shaft shown). FIG. 17(E) shows a final step of aligning chambers with pistons #1 and #3 joined together and #2 and #4 joined together in a straight vertical line to form an embodiment of a DDMotion 1-Stroke straight line engine.

FIG. 18 provides a further table that may be labeled Pistons and Engines with three columns for 1) a conventional 4-stroke engine, 2) a conventional 2-stroke engine and 3) an embodiment of a DDMotion 1-Stroke engine overview. The columns of the table each provide in the second row of the table a number and type of piston (the DDMotion 1-stroke embodiment having 2 double-headed pistons, third and fourth rows, no crankshaft or crankcase shown, fifth row, four dedicated chambers, sixth row, no shared chambers and, seventh row, the piston assembly (as shown). The first row of the table comprise pictures of two conventional pistons in side view, or in the case of a DDMotion 1-Stroke engine embodiment, a mechanical diagram of a piston assembly first shown in FIG. 14. The third row of the table provides the number of crankshafts for each engine. The fourth row of the table provides the number of crankcases. The fifth row of the table provides the number of dedicated chambers. The sixth row provides the number of shared chambers. In the last horizontal row, row seven, the typical 4-stroke conventional engine comprises four piston assemblies, the 2-stroke has two piston assemblies and the DDMotion embodiment may comprise only one piston assembly.

FIG. 19(A) shows a first embodiment of a straight/linear 1-Stroke DDMotion piston assembly with four dedicated chambers A, B, C and D and two double-headed pistons, piston #1 and piston #2 joined by a common central shaft 1410 first shown in FIG. 14. FIG. 13(A) and FIG. 13(B) each show the housing 1300 with end plates 1310-1 and 1310-2 and central plate 1315, but FIG. 13(B) shows the cylinder housing 1300 without the central, common shaft 1410. Similar reference numbers will be used herein wherein the first digits of the reference number denote where an element first appears, for example, center plate 1315 first appears in FIG. 13(A) and central, common shaft 1410 first appears in FIG. 14. There are apertures in end plates 1310-1 and 1310-2 of FIG. 13(A), 19(A) to permit shaft 1410 to have reciprocating motion external to the cylinder housing 1300. There may be side slots in housing 1300 of FIG. 19(B) to permit external rods 1905-1 and 1905-2 to tie piston #1 to piston #2 and point to the right to provide reciprocating motion. In FIG. 19(A), the pistons #1 and #2 are in a left side position and the shaft 1410 extends to the left to begin a stroke to the right.

FIG. 19(B) shows a second embodiment of a straight/linear 1-Stroke DDMotion piston having the same four chambers A, B, C and D and double-headed pistons #1 and #2 wherein the pistons #1 and #2 are joined by external side rods 1905-1 and 1905-2, replacing the common, central shaft 1410, but performing the same function to join the double-headed pistons together and move them together. Only one set of rods 1905 is necessary and may provide output to the left, to the right or to both the left and the right. While a rectangular connection of the first and second pistons is shown to join the pistons #1 and #2 on each side with respective side rods 1905-1 and 1905-2, it should be appreciated that stress relief may be achieved by a more curved to the right line joining of each piston to the external rod 1905 (or curved to the left if the pistons are to be joined to an output on the left) if right side output is desired. Moreover, in an alternative embodiment, only one external rod 1905 may be used. Furthermore, it may be assumed that there exist linear slots in the sides of the cylinder housing 1300 to permit the pair of external rods 1905-1, 1905-2 to move in reciprocating motion, back and forth in a similar manner to shaft 1410. It is also possible to combine the embodiment of FIGS. 14(A) and 14(B) and have both a common central shaft and external rods joining the pistons #1 and #2 together.

Referring now to FIG. 20(A), FIG. 20(B) and FIG. 20(C), FIG. 20(A) through FIG. 20(C) show the development of an opposed piston, opposed cylinder embodiment of FIG. 20(C) comprising five pistons and four chambers. Beginning with FIG. 20A, FIG. 20(A) provides a simplified mechanical diagram of an embodiment of a DDMotion 1-Stroke straight two double-headed piston engine, for example, of FIG. 19(A). In FIGS. 19(A) and 20(A), similar reference numerals are used to designate similar elements. Note that the central, common shaft 1410 is not in a reciprocated movement to either the left or to the right but could join to an output on either side in FIG. 20(A). FIG. 20(B) shows a next step toward an OPOC engine of the present invention of using an internal housing 1300 within an external housing 2000 and external rods 2005-1 and 2005-2 (one or two sets) pass through external housing 2000 to permit movement of the engine of FIG. 20(A) within the external housing 2000 to form a 1-stroke straight two-piston opposed piston, opposed cylinder OPOC engine. Note that the central, common shaft 1410 in FIG. 20(B) may be connected to or integral with piston #1 and piston #2. Also, the central, common shaft 1410 may pass through lubricated apertures in each of central wall 1315 and end plates of the housing 1300 and at least one aperture of an end plate of external housing 2000 (both end plates of housing 2000 showing shaft 1410 extending therefrom).

FIG. 20(C) shows the addition of shaded single headed pistons #3 and #5 and double-headed piston #4 (in the center) joined by external rods 2005-1 and 2005-2 (or just one set); removal of the internal housing 1300 leaving external housing 2000 with end plate 2010 shown and an increase in the number of pistons to five including non-shaded double-headed pistons #1 and #2, retained from FIG. 20(B). These pistons #1 and #2 are connected to or integral with common, central shaft 1410. Central shaft 1410 is shown extending through bored, lubricated apertures in each of pistons #3, #4 and #5 and end plates of housing 2010 so that the reciprocating motion may be as smooth and friction-free as possible by known means. The engine of FIG. 20(C) is further re-structured so the external rods comprise external rods joined to three of the five pistons (#3, #4 and #5) and pistons #1 and #2 to shaft 1410 to form the 1-stroke straight five piston OPOC embodiment. The dedicated chambers of this OPOC embodiment are numbered A, B, C and D where A and C are compressed and B and D expanded between the pistons. Note that shaft 1410 moves to the left when rods 2005 move to the right and vice versa to create a reciprocating output. In one embodiment, the external rods may be fixed and only the shaft 1410 move left and right or vice versa, the external rods 2005 move left and right and the shaft 1410 may be fixed in position.

Figure 21:
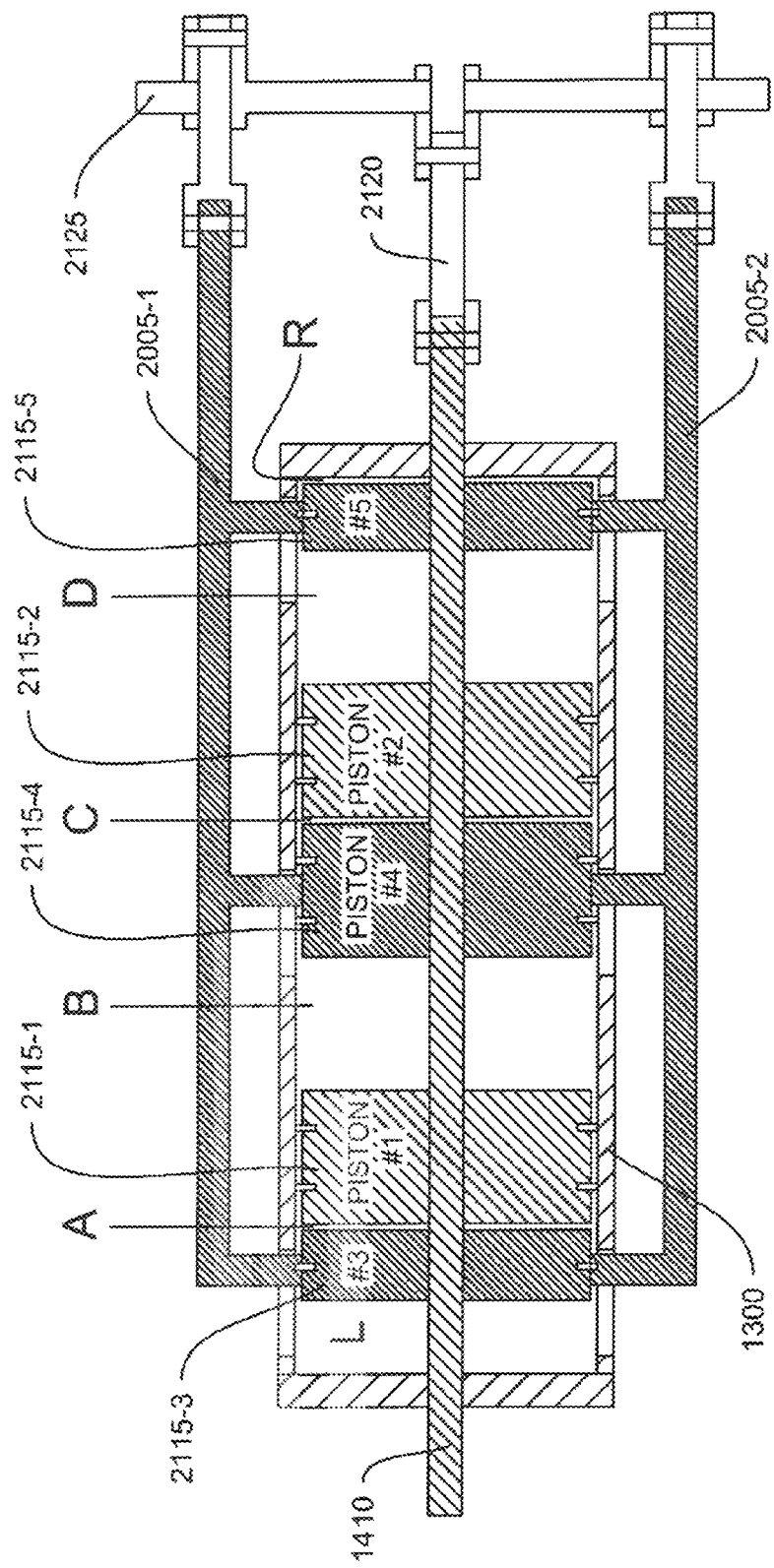
FIG. 21 shows the five piston OPOC 1-Stroke DDMotion embodiment in detail including its connection to a crankshaft via a central shaft wherein pistons 3, 4 and 5 are attached together by side rods and pistons 1 and 2 are attached to the common central shaft and wherein there are four dedicated chambers A, B, C and D.

Now an embodiment of a five piston straight OPOC 1-stroke piston wherein three crankshafts drive an output shaft will be discussed with reference to FIG. 21 with three connections 2120 to the output shaft shown. FIG. 21 shows a five piston OPOC 1-stroke DDMotion embodiment in detail (similar to that of FIG. 20(C) including its shaft 1410 connection 2120 to an output shaft 2125 via the central shaft 1410 and also by each of two external rods 2005-1, 2005-2 wherein pistons #3, #4 and #5 are attached together by side rods 2005-1 and 2005-2 and pistons #1 and #2 are attached to the common central shaft 1410. Central common shaft 1410 is firmly connected to or integral with double-headed piston #1 and #2. At least pistons #3, #4, and #5 may be lubricated or have roller bearing apertures machined into them to make them slide over the shaft 1410 with ease. There are four dedicated chambers A, B. C and D (A and C being compressed). When pistons 2115-1, 2115-3 and 2115-5 are fixed by rods 2005-1 and 2005-2 together, the connections 2120 reciprocate left and right causing central, common shaft 1410 and rods 2005 to turn an output shaft connected by connections 2120. The chambers may follow the cycle of FIG. 16 where functions are dedicated to chambers. There were also four chamber A, B, C and D shown in FIG. 20(A), and these also may follow the Otto cycle of dedicated functions to chambers of FIG. 16.

Figure 22:
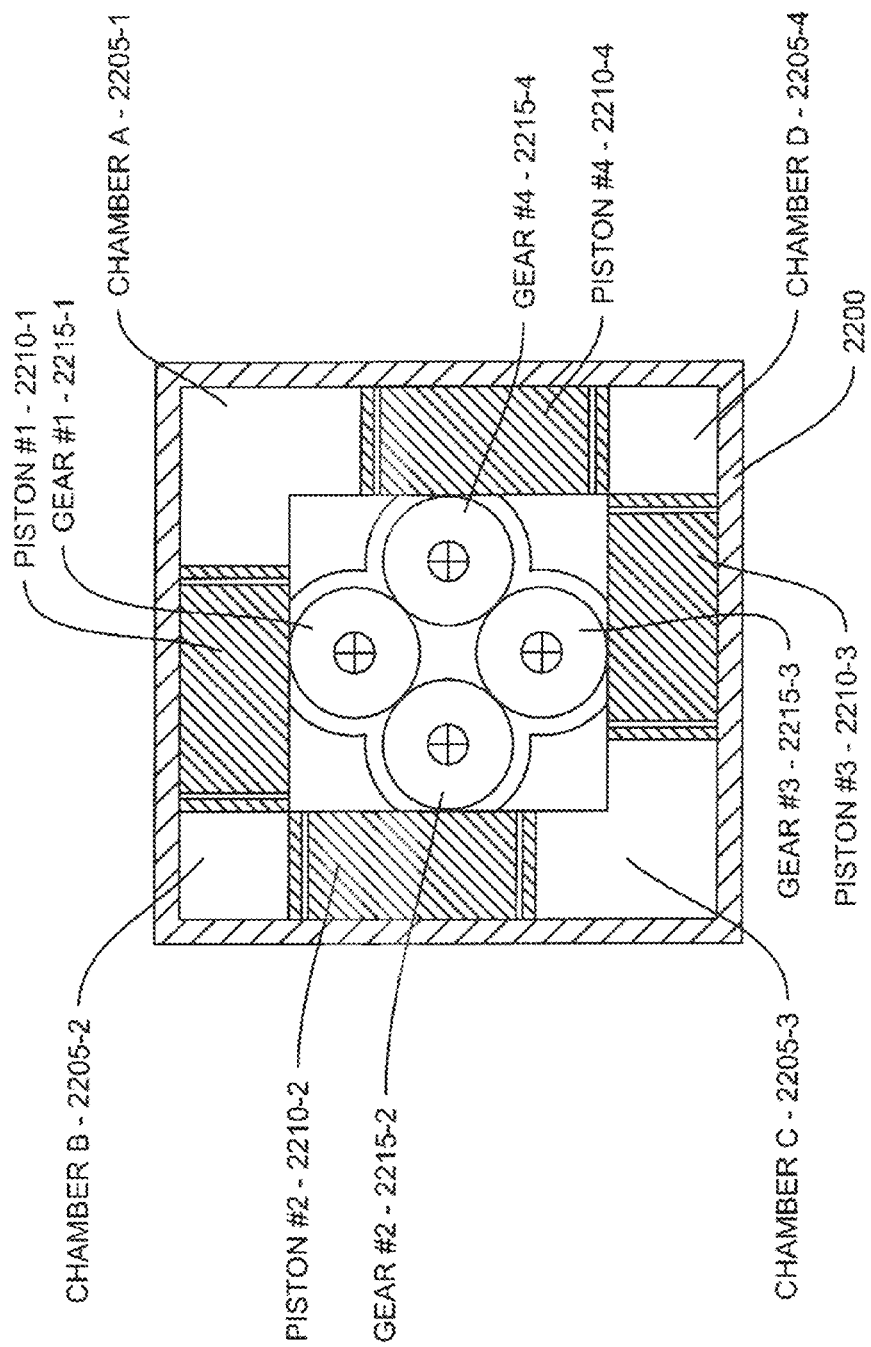
FIG. 22 shows an overview mechanical diagram of a two-stroke straight opposed piston embodiment of a DDMotion OPOC engine wherein the four double-headed pistons #1, #2, #3 and #4 and their chambers A, B, C and D form a square and are contained in a housing having a square cross-section and may be adapted according to the principles of the present invention wherein chambers A and C of the first and third double headed pistons are expanded and the chambers B and D of the second and fourth double headed pistons arranged alternately in a conventional configuration are compressed such that the engine repeating cycle of FIG. 14 may be employed to convert a 720 degree cycle to a 180 degree power stroke cycle.

Referring now to FIG. 22, there is shown a four double-headed, straight, opposed pistons embodiment of the present invention such that the four pistons and chambers form a square cross-section surrounding and internal to, for example, square housing 2200. Inside square housing 2200, against the outer walls of the housing 2200 are the four double-headed pistons, piston #1, 2210-1; piston #2, 2210-2, piston #3, 2210-3; and piston #4, 2210-4. Each piston has an associated dedicated chamber and gear that is driven thereby. Piston #1, 2210-1 has chamber A, 2205-1, and gear #1 2215-1. Piston #2, 2210-2 has chamber B, 2205-2, and gear #2 2215-2. Piston #3, 2210-3 has chamber C, 2205-3 and gear #3 2215-3 and piston 4, 2210-4 has chamber D, 2205-4 and gear #4, 2215-4. The four gears also form a square and are intermeshed such that whichever piston is ignited, all gears respond in a reciprocating motion depending on which piston is ignited. This engine also has functions dedicated to chambers A, B, C and D and follows a coordinated Otto cycle per FIG. 16

Figure 23:
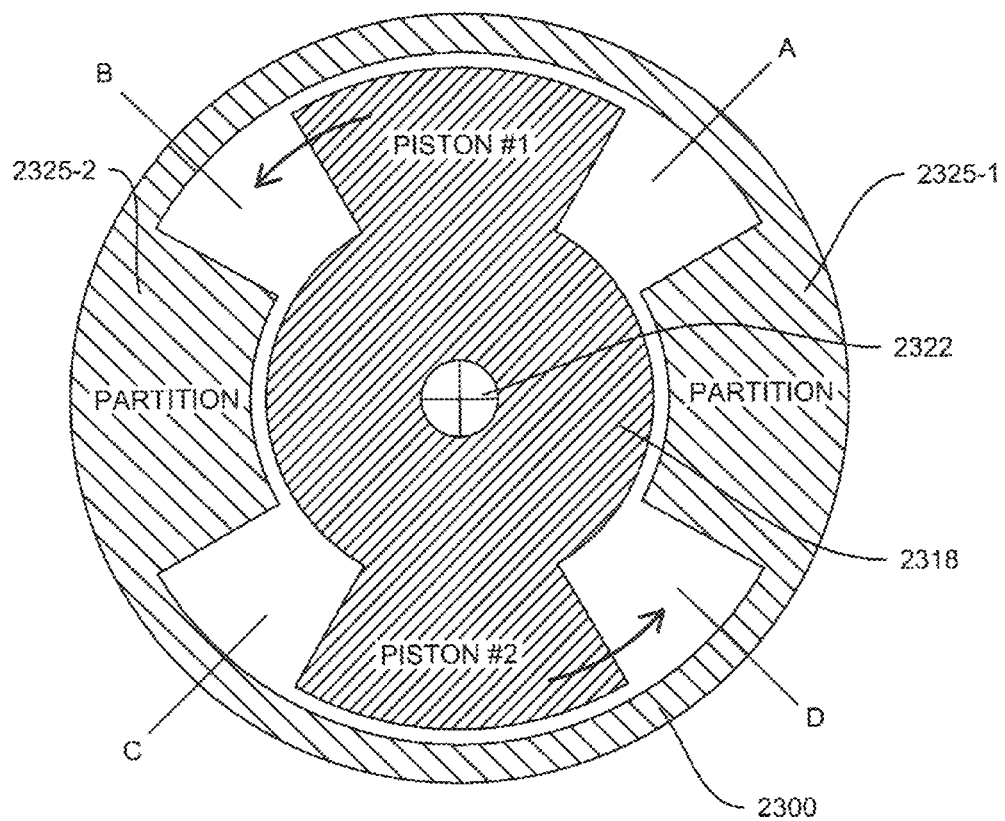
FIG. 23 shows an overview of reciprocating rotary piston engine, an embodiment of a 1-Stroke DDMotion rotary engine in a cylindrical housing having a piston #1 and a piston

Referring now to FIG. 23, there is shown an embodiment of a 1-stroke rotary piston engine and crankshaft in circular cross-section housing 2300. Housing 2300 has first and second partitions 2325-1 and 2325-2 which limit the reciprocating movement of piston #1 and piston #2 either connected to or integral with a circular cross-section 2318 surrounding central, common output shaft 2322. The engine shows four dedicated chambers A, B, C and D where A and C are compressed when B and D are expanded and vice versa. Each chamber A, B, C and D follows the dedicated function to chamber table of an Otto cycle shown in FIG. 15 or 16. Piston #1 and Piston #2 reciprocate between partitions 2325-1 and 2325-2. One stroke of pistons #1 and #2 comprises one of a clockwise movement from stop to speed to stop when reaching almost to a respective partition. Another stroke may be a counter-clockwise movement of pistons #1 and #2 together, analogous to the straight line 1-stroke embodiment. Valves and spark plugs may be installed in the partitions 2325-1 and 2325-2 or to the cylinder housing 2300.

Referring now to FIG. 15, a rotary engine of FIG. 23 may be stopped with the piston #1 and #2 at approximately top dead center (not with compressed or expanded chambers). When ignition occurs in chamber C, the ignition of any air-gas mixture in chamber C will cause the Piston #2 to move counter-clockwise in the direction of the arrow shown simultaneously with Piston #1. Thus, the engine may be started. Nevertheless, the engine of FIG. 23 continues to run following an Otto cycle per FIG. 16.

Referring to FIG. 16 for the purpose of explaining a rotary 1-stroke engine of FIG. 23, the repeating engine cycle will be explained beginning with starting the engine (STARTING)

(FIG. 15). Piston rings (seals) for a rotary 1-stroke internal combustion engine may be installed and repaired externally to the cylinder housing. As shown in FIG. 16, two chambers B and D may be first open (expanded) and two cavities, chambers A and C are mostly closed (compressed) by the reciprocating rotary piston/seal in a starting position with blades (paddles) (cylinders) of the piston in the upper right and lower left of FIG. 23.

To start the engine, 1) the chamber B may be open and is dedicated to exhaust; 2) fuel is filled to make an air/fuel chamber A of the upper left of the cycle table which is the intake chamber; 3) a rotary piston is rotated counter-clockwise CCW to compress chamber B; 4) in stroke 2, chamber B is then filled with an air-fuel mixture and 5) chamber D is ignited causing a clockwise stroke after the initial counter-clockwise stroke. The resulting fuel/air mixture ignition drives the piston #1 from a position in the upper left quadrant to a position in the upper right quadrant to start the engine Otto cycling and the lower piston #2 also moves clockwise from the lower right quadrant to the lower left quadrant.

Conventional means may be used for ignition and fuel ignition such as spark plugs with spark distributed in sequence. Ignition may occur in the embodiments of FIGS. 16 at any convenient point so as to ignite the compressed fuel/air mixture in the chamber to be ignited (chambers A, B, C, D of any of the above-described engines in sequence). However, in a preferred embodiment, electronics may be used to properly clock ignition/spark and the fuel intake and exhaust times and known devices such as valves and seals and the like may be accessed from outside the cylindrical housing. Also, instead of mechanical cams, solenoids may actuate opening and closing (intake and exhaust). As already suggested, known fuel injection systems may be applied. Since the intake and exhaust are dedicated at each of the four stages of a repeating cycle, the timing for opening and closing the cavities are improved when compared with a two-stroke or rotary engine and approximately the same as exhibited by a four-stroke engine, for example, with scavenging. The following table provides an example of an engine start per FIG. 15. Any one of the chambers A, B, C and D may be ignited and find a pair of pistons of a 1-stroke engine in any position such that the position of a pair of pistons should change with an ignition of an air/fuel mixture in a table

TABLE 1

Assigned functions to a stroke if stroke 1 of FIG. 15 or 16 is the first stroke.

| | Chamber A | Chamber B | Chamber C | Chamber D |
|---|---|---|---|---|
| Stroke #1 | INTAKE | EXHAUST | IGNITE | COMPRESS |
| Stroke #2 | | | | |
| Stroke #3 | | | | |
| Stroke #4 | | | | |

A 1-stroke engine of the present invention may be modified a 4-stroke internal combustion engines as discussed above. Each of the functions assigned to the respective four chambers will go through Otto cycles. Table 2 shows the cycle of chamber A. (Chamber A is selected since the first function may be "intake".) Table 3 shows the cycles of all chambers or a rotary of 1-stroke straight Cycle.

TABLE 2

Cycle of Chamber 3.

| | Chamber A | Chamber B | Chamber C | Chamber D |
|---|---|---|---|---|
| Stroke #1 | INTAKE | EXHAUST | IGNITE | COMPRESS |
| Stroke #2 | COMPRESS | | | |
| Stroke #3 | IGNITE | | | |
| Stroke #4 | EXHAUST | | | |

In Table 3 below, which provides a complete cycle, it may be seen, for example, that a given function moves from stroke to stroke on the diagonal. For example, it may be seen that INTAKE moves on the diagonal through the Chambers A, B, C and D while IGNITE moves through the chambers C, D, A and B on the diagonal. So any function assigned to a chamber in one stroke may be assigned on the diagonal to the next chamber in succession in the next stroke.

TABLE 3

One-Stroke Rotary Cycles (Cycles of All Chambers)

| | Chamber A | Chamber B | Chamber C | Chamber D |
|---|---|---|---|---|
| Stroke #1 | INTAKE | EXHAUST | IGNITE | COMPRESS |
| Stroke #2 | COMPRESS | INTAKE | EXHAUST | IGNITE |
| Stroke #3 | IGNITE | COMPRESS | INTAKE | EXHAUST |
| Stroke #4 | EXHAUST | IGNITE | COMPRESS | INTAKE |

FIG. 24 shows a mechanical diagram of an embodiment of a DDMotion rotary piston opposed piston, opposed cylinder (OPOC) engine 2400. The engine is contained in a cylinder housing 2400 having a circular cross-section. Inside circular housing 2400 is an internal housing having a circular cross-section portion 2405. This housing portion 2405 has connected to it or integral with it piston #3, 2420-1, and piston #4, 2420-2. These are similar to the partitions of the engine of FIG. 23 except, because of the internal/external housing construction, piston #3, 2420-1, and piston #4, 2420-2, are able to reciprocate in opposite direction from internal piston #1, 2415-1 and piston #2, 2415-2. Piston 2415-1 and piston 2415-2 are connected to or integral with a central shaft 2422 and share a circular cross section portion 2418 which joins Piston #1 and Piston #2 together and which in turn has, at its center, a shaft 2422 for output. Four dedicated chambers are formed by the four pistons: chambers A and C are shown compressed while chambers B and D are shown expanded. The embodiment comprises four pistons, pistons #3 and #4 being integral with or attached to the internal cylindrical housing 2405 of an external cylindrical housing 2400. Pistons #1 and #2 are joined by the cylindrical center portion 2418 and central crankshaft 2422 forming the four dedicated chambers A, B, C and D. Conventional valves and spark plugs may be installed to end plates of the external cylindrical housing 2400 (not shown). Similarly to the straight OPOC engine, internal pistons #3 and #4 may be connected to rods not shown for joining to an output shaft and the central shaft 2422 may provide a contrary output so that a reciprocating movement occurs between internal housing 2405 and shaft 2422. External housing 2400 may remain stationary in one embodiment with the internal members performing the reciprocating clockwise/counterclockwise movement. The rotary OPOC engine follows an Otto cycle, dedicating functions to chambers as explained above with reference to FIGS. 15 and 16.

FIG. 25(A) through 25(C) show mechanical diagrams of alternative embodiments forming N-stroke pistons following the principles of a 1-stroke engine. FIG. 25(A) is a mechanical diagram of a 4-stroke piston engine having four single-headed pistons #1, #2, #3 and #4, each housed in a separate housing 2501, 2502, 2503 and 2504 extending to an output shaft 2510. Each of housings 2501, 2502, 2503 and 2504 form one dedicated chamber A, B, C or D in each, and each have a central, common shaft coupled to a common output shaft 2510. Pistons #1 and #3 may be on opposing sides of the crankshaft 2510 from pistons #2 and #4. Each piston #1 through #4 may be a single-headed piston. Thus, altogether, the engine is a 4-stroke piston engine with 4 single-headed pistons.

FIG. 25(B) shows a mechanical diagram of a 2-stroke piston engine having two double-headed pistons #1 and #2 each forming two dedicated chambers A and B and C and D respectively, each within their own housings 2511, 2512 aligned on opposing sides of a central common output shaft 2520. Each piston has a central common shaft for driving a crankshaft for turning an output shaft 2520. This is a 2-stroke engine having two double-beaded pistons, piston #1 and piston #2.

FIG. 25(C) shows an embodiment of a DDMotion 1-Stroke engine having two double-headed pistons #1 and #2 within a cylinder housing as seen before for turning an output shaft 2530 via a crankshaft. The engine forms a straight linear engine with four dedicated chambers A, B, C and D, A and C being compressed when B and D are expanded. The FIGS. 25(A) through 25(C) show a principle of the present invention that the present DDMotion 1-Stroke engine may be expanded to become an N-stroke engine of N strokes where N may be 1, 2, 4 or larger number of pistons—single or double-headed with dedicated chambers. One varies the use of double-headed pistons within one separated cylinder housing with a center plate to two double-headed pistons with two opposite cylinder housings to four single-headed pistons, each having their own cylinder housing to move from a 1-stroke double-headed two connected pistons engine to a 4-stroke piston engine.

FIG. 26(A) through FIG. 26(D) show alternate means of coupling a 1-stroke, central common shaft 2620, two double-headed cylinder embodiment of the present invention to output 2645. FIG. 26(A) and FIG. 26(C) show a side view and an overhead view of a crankshaft machined shaft split bushing embodiment respectively for coupling a 1-stroke engine having a central, common, reciprocating shaft 2620 coupled to a connector 2630 and shaft 2635 in a manner of a crankshaft machined shaft, split bushing to an output 2645 as seen in FIG. 26(C).

Furthermore, a Crankgear™ shaft bearing per FIG. 26(B) and FIG. 26(D) produces an output 2645 where FIG. 26(B) and FIG. 26(D)) show a side view and an overhead view of a Crankgear shaft bearing embodiment respectively for coupling a 1-stroke engine to produce an output 2645. In FIG. 26(B) and FIG. 26(D), a similar connector 2630 drives in a reciprocating manner a similar shaft 2635 to a circular Crankgear shaft bearing 2640 having a similar central shaft 2620 for producing the output 2645 of FIG. 26(B) or 26(D).

FIGS. 27(A) and (B) show corresponding overhead and side views of a drivers and gears controlled piston output to an output shaft via a crankshaft (FIG. 27(A)). FIG. 27(A) shows a mechanical diagram including a 1-Stroke DDMotion rotary engine embodiment (FIG. 23) coupled to a driver and gear output control. FIG. 27(B) shows a side view where more particular detail is shown of the driver and gear control for reciprocating movement and driving the output crankshaft of FIG. 27(A). FIG. 27(B) shows in a bottom (front) view a driver 2707 and further gears control for a rotary internal combustion engine embodiment of the present invention of FIG. 20. Shaft 2701 shown in the top (cross-sectional) view is the reciprocating rotary internal combustion engine output which is reciprocating within a 180° coordinated power cycle as described above. Gear 2702 is attached to engine reciprocating shaft 2701. Gear 2703 is a dummy/idle gear with a bearing 2704. Rack gear 2705 meshes with gear 2702 at the top. Rack gear 503 meshes with gear 2703 at the bottom. Driver 2707 has half-width rack gears 2705 and 2706 and meshes selectively to gears 2702 and 2703. Driver 2707 output is reciprocating back-and-forth and is connected to the output shaft via a crankshaft. Driver 2707 drives a crankshaft (FIG. 27(A)) to convert the back-and-forth movement to uni-directional rotational output per the output shaft of FIG. 27(A).

FIGS. 28(A) and (B) show corresponding side and overhead views of a gears and Sprags controlled piston output of a DDMotion 1-Stroke or other engine embodiment. FIG. 27(A) shows the gears and Sprags, and FIG. 27(B) provides an overhead mechanical diagram showing the central, common shaft input 2801 from a piston of, for example, a 1-stroke engine embodiment and the uni-directional output 2806B given the reciprocating input as well as a further output shaft 2806A. In FIGS. 28(A) and (B), there are shown gears and Sprags (defined above) which control engine 2800 output to be unidirectional at output shaft 2806B. Engine 2800 is shown comprising an input from piston 2801 and a unidirectional engine output shaft 2806B. Gear 2802 is a gear attached to the reciprocating shaft 2801 and is meshed to gears 2803A and 2803B. Gear 2803A is a gear meshed to gear 2802 and embedded with Sprag 2804A; (Sprag, a one-way rotational gear as indicated above, and denoted with a capital "S" to represent its unidirectional output ability). Gear 2804A is also a Sprag but is embedded in gear 2803A. Race 2805A is a race for Sprag 2803A. Shaft 2806A is a shaft attached to race 2805A. Gear 2807A is a gear attached to shaft 2806A. Gears 2803B through 2807B are an identical set to gears 2803A through 2807A. Gears 2807A and 2807B are meshed. Shaft 2806B is the output shaft which is unidirectional due to the combined gear and Sprag action. Forward and reverse may be obtained in known manner from my earlier patents and published applications incorporated herein by reference. Sprags 2804A and 2804B are ratcheting in opposite directions with the reciprocating input 2801 so that the output 2806B becomes unidirectional.

FIG. 29(A) and FIG. 29(B) comprise side view and end view mechanical diagrams of two double-headed straight pistons 2915-1 and 2915-2 joined by a central common shaft. FIG. 29(A) shows two double-headed pistons forming dedicated chambers A, B, C and D (A and C expanded and B and D compressed) of a DDMotion 1-stroke embodiment with intake valve, spark plugs and exhaust valves indicated in a housing having a central, common, output gear or shaft 2940 (and an idle gear or bearing 2945) and FIG. 29(B) shows the double-headed pistons in side view with the output shaft 2940 extending to the right from the housing and connected to or integral with output gear 2942.

FIG. 29(A) and FIG. 29(B) show a demonstration of two double-headed straight pistons to emulate a more conventional four piston embodiment. Such a conventional four piston internal combustion engine would have 720° of power stroke. According to the principles of FIG. 29(A) and FIG. 29(B), a conventional internal combustion engine may be converted to practice the principles of the present invention with chambers A and C shown expanded and chambers B and D shown compressed (FIG. 29(A)) in the first and second parallel, one above the other, pistons 2915-1 and 2915-2 and have a 180° power stroke. Conventional ignition points are shown for all four double-headed pistons at opposing sides from the output shaft 2940 (output gear 2942 and shaft 2940) in the middle. These locations may be varied from that shown so long as they are capable of igniting the respective ignite chambers in sequence. The two double-headed straight pistons 2915-1 and 2915-2 are arranged above and below an output gear/shaft 2940 shown in end-on FIG. 29(A) and in side view as FIG. 29(B) with idle gear or bearing 2945 set positioned above/below the double-headed pistons 2915-1 and 2915-2. FIG. 29(A) shows chambers A and C expanded and chambers B and D compressed, the engine cycling being an Otto cycle as described above for the dedicated chambers A, B, C and D per FIG. 16.

FIG. 30(A) through FIG. 30(C) comprise mechanical diagrams showing a 1-stroke rotary opposed piston embodiment of the present engine invention with Transgear control wherein FIGS. 29(A) and FIG. 29(B) each shows piston #1 in filled shading and piston #2 in slanted line shading with dedicated chambers A, B, C and D numbered and showing reciprocating movement whereby chambers B and D are initially compressed in FIG. 30(A) and expanded in FIG. 30(B) and wherein FIG. 30(C) shows the common, central reciprocating input shaft, Sprag #1 and Sprag #2 and sun and output gears among other gears to control and provide a uni-directional output of a Transgear controlled reciprocating rotary opposed piston embodiment of the present engine invention.

FIG. 30(A), in particular, shows a first position with opposed pistons #1 and #2 shown at the top with chambers A and C expanded and B and D compressed. FIGS. 30(A) and 30(B) have chambers A, B, C and D which have dedicated functions to chambers per the Otto cycle of FIG. 16. Piston #1 is shown shaded and Piston B is shown in parallel line shading. FIG. 30(B) shows pistons #1 and #2 moved to the sides with chambers B and D expanded and chambers A and C compressed. FIG. 30(C) shows a cross-sectional view of the (OP) engine with piston #1 hidden, but piston #2 (parallel line shading) is visible surrounding central common shaft, output gear and output shaft. Idle gears are shown at corresponding left top and bottom positions. Left and right sun gears are identified where the left sun gear may be integral with the shaft or attached to the shaft. An output section is shown at right driven by the shaft comprising first and second Sprags #1 and #2. An output gear is integral to or connected to the shaft. A Sprag gear couples the output gear to the output shaft and an output gear is shown integral to or connected to the output shaft.

FIGS. 31(A), FIG. 31(B) and FIG. 31(C) show exemplary embodiments for rotary piston seals wherein FIG. 31(A) shows a rotary 1-stroke piston engine embodiment with seal plates, piston-shaped seal and C-shaped seals installed in a rotary 1-stroke engine of the present invention. FIG. 31(B) shows details of the piston-shaped seal of the rotary engine of FIG. 31(A). FIG. 31(C) shows details of a C-shaped seal of the rotary engine of FIG. 31(A). FIG. 31(D) shows a typical seal plate of the seal plates of FIG. 31(A). FIGS. 31(B), FIG. 31(C) and FIG. 31(D) show alternative embodiments of seals and seal plates and provide three views including an overview of alternative rotary piston seals. FIG. 23 shows a piston at top dead center which may have a C-shaped seal or seal plate (replacing a partition). Seal plates may seal a diameter of the cylindrical housing. Also seen in FIG. 31(A) are seal plates that may be on either side of a piston paddle of the lower portion of the piston. FIG. 31(B) shows an embodiment of a piston-shaped seal of FIG. 31(A), and FIG. 31(C) provides a view of a seal plate of FIG. 31(A).

The purpose of the foregoing Abstract is to enable the U.S. Patent and Trademark Office and the public generally and especially the scientists, engineers and practitioners in the relevant art(s) who are not familiar with patent or legal terms or phraseology, to determine quickly from a cursory inspection the nature and essence of this technical disclosure. The Abstract is not intended to be limiting as to the scope of the present invention in any way.

What I claim is:

1. An internal combustion engine having four power strokes of a four stroke Otto cycle, the internal combustion engine comprising:
    a piston assembly of four single-headed pistons for driving a crankshaft, each single-headed piston mounted in a respective cylindrical housing having an end plate, each end plate and each corresponding single-headed piston having a central shaft mounted for reciprocating motion with the other three single-headed pistons to drive the crankshaft, the crankshaft being coupled to an output shaft for rotational movement through one hundred eighty degrees with each power stroke of the four piston assembly, the four pistons being numbered one, two, four and three in order along the crankshaft, the first and third single-headed pistons one and three being located opposite to the second and fourth single-headed pistons two and four, the first and third single-headed pistons one and three being mounted on an opposite side of the crankshaft and the second and fourth single-headed pistons two and four being mounted adjacent to one another and on an opposite side of the crankshaft from the first and third single-headed pistons one and three, the cylindrical housings defining respective, alternatively expandable and compressible chambers between the end plates of the cylindrical housings and the respective first through fourth pistons of the piston assembly such that when first and third chambers of the housings of the first and third pistons are expanded, the second and fourth chambers of the housings of the second and fourth pistons are compressed; and the first, second, third and fourth chambers respectively being sequentially ignited in four power strokes of a repeating Otto cycle.

2. A rotary internal combustion engine, the rotary internal engine comprising:
    a piston assembly comprising first and second opposed pistons each having a curved external surface for meeting an internal wall portion of a cylindrical housing, the piston assembly further comprising a solid, circular, central portion surrounding and joined to a central shaft, the first and second opposed pistons being integral with or connected to the solid, circular, central portion, and
    the cylindrical housing having first and second opposing partitions integral with or connected to the circumference of the cylindrical housing, each of the first and second partitions consuming greater than thirty degrees of the three hundred sixty degree circumference of the cylindrical housing, the first and second opposing partitions having end walls forming approximately equal volumes replaced in part by the first and second opposed pistons of the piston assembly,
    the rotary internal combustion engine having a one hundred eighty degree power stroke per piston, the engine comprising first and second opposed pistons of the piston assembly for reciprocating motion of the central shaft in opposite rotational directions from one another within the cylindrical housing and the cylindrical housing and opposing partitions together with the piston assembly of the first and second opposed pistons and the solid, circular, central portion having four chambers formed by the first and second partitions of the circular housing and the piston assembly, and the four chambers being dedicated to successively performing each of four functions comprising ignition, intake, compression and exhaust during each of four power strokes of an Otto cycle; and an external cylindrical housing for housing the cylindrical housing having the first and second opposing partitions, the first and second opposing partitions forming third and fourth opposed pistons to the first and second opposed pistons of the piston assembly, the first and second approximately equal volumes formed between the first and second opposed pistons and the third and fourth opposed pistons, the rotary internal combustion engine having the first and second four stroke straight opposed pistons coupled to a central output shaft.

3. The rotary internal combustion engine as recited in claim 2, the cylindrical housing comprising a cylindrical housing having a circular cross-section and the cylindrical housing having the central shaft internal to the cylindrical housing and the internal central shaft coupled to an output gear section, the output gear section being transgear controlled to provide a coordinated expansion/compression of the four dedicated chambers successively formed in the first and second equal volumes to produce unidirectional motion of an output shaft.

4. A straight internal combustion engine comprising:

a housing having a square cross-section; and a piston and gear assembly contained in the housing, the piston and gear assembly comprising two pairs of opposed pistons located along the exterior of each side of the housing having the square cross-section and associated centrally located gears located inside the housing having the square cross section and having approximately one hundred eighty degrees of rotational movement per power stroke, the two pairs of opposed pistons driving their respective associated centrally located gears, the internal combustion engine having four chambers A, B, C and D formed in four approximately equal volumes located at the corners of the housing having the square cross section, the four chambers having chambers A and C at opposite corners of the square cross-section expanded when chambers B and D at the other opposite corners of the square cross-section are compressed, the chambers A, B, C and D formed at the corners by the reciprocating movement of each of the two pairs of opposed pistons, the four chambers for Otto cycle functions of ignite, intake, compress and exhaust.

* * * * *